US012779774B2

(12) United States Patent
Belvisi et al.

(10) Patent No.: US 12,779,774 B2
(45) Date of Patent: Nov. 3, 2026

(54) METHOD FOR PRODUCING A SHELL-LIKE OR PLATE LIKE SUPPORTING STRUCTURE

(71) Applicant: Francesco Belvisi, Pantelleria (IT)

(72) Inventors: Francesco Belvisi, Pantelleria (IT); Alessandro Buscemi, Altavilla Milicia (IT); Antonio Mangiapane, Palermo (IT)

(73) Assignee: NUGAE S.R.L., Roccavaldina (IT)

( * ) Notice: Subject to any disclaimer, the term of this patent is extended or adjusted under 35 U.S.C. 154(b) by 316 days.

(21) Appl. No.: 18/247,692

(22) PCT Filed: Sep. 30, 2021

(86) PCT No.: PCT/IB2021/058979
§ 371 (c)(1),
(2) Date: Apr. 3, 2023

(87) PCT Pub. No.: WO2022/070121
PCT Pub. Date: Apr. 7, 2022

(65) Prior Publication Data

US 2024/0017479 A1 Jan. 18, 2024

(30) Foreign Application Priority Data

Oct. 2, 2020 (IT) ........................ 102020000023260

(51) Int. Cl.
*B29C 64/118* (2017.01)
*B29L 31/30* (2006.01)
(Continued)

(52) U.S. Cl.
CPC ..... *B29C 64/118* (2017.08); *B29L 2031/3005* (2013.01); *B29L 2031/307* (2013.01);
(Continued)

(58) Field of Classification Search
CPC ..... B64F 5/10; B64C 3/18; B64C 3/26; B32B 37/10; B29C 65/00
See application file for complete search history.

(56) References Cited

U.S. PATENT DOCUMENTS

2003/0042364 A1* 3/2003 Tanaka ...................... B64C 3/20 244/123.2
2016/0311165 A1* 10/2016 Mark .................... B29C 64/386
(Continued)

FOREIGN PATENT DOCUMENTS

RO 132984 A1 * 12/2018
WO 2016177752 A1 11/2016
(Continued)

OTHER PUBLICATIONS

International Search Report and Written Opinion of PCT/IB2021/058979, mailed on Jan. 24, 2022, 11 pages.

*Primary Examiner* — Alison L Hindenlang
*Assistant Examiner* — Debjani Roy
(74) *Attorney, Agent, or Firm* — Victor Cardona, Esq; Heslin Rothenberg Farley & Mesiti P.C.

(57) ABSTRACT

Shell-like or plate-like supporting structures, are obtained by forming one or more panels using Fused Deposition Modelling technology to obtain panels with a lattice of stiffening ribs on at least one face of the panels. The stiffening ribs are hollow and are formed simultaneously with forming of the panel, by moving a dispensing head) that dispenses a continuous thread of material according to a closed-loop path to form each layer, or else according to a path between two opposite ends that is followed back and forth in the two directions to obtain different layers of the panel and that includes loop-shaped stretches to define the aforesaid hollow ribs. The cavities of the ribs can be filled with additional reinforcement material.

16 Claims, 17 Drawing Sheets

(51) Int. Cl.
*B33Y 10/00* (2015.01)
*B33Y 80/00* (2015.01)

(52) U.S. Cl.
CPC ....... *B29L 2031/3085* (2013.01); *B33Y 10/00* (2014.12); *B33Y 80/00* (2014.12)

(56) References Cited

U.S. PATENT DOCUMENTS

| | | | | |
|---|---|---|---|---|
| 2018/0355842 | A1* | 12/2018 | Badger | B33Y 80/00 |
| 2020/0114573 | A1* | 4/2020 | TenHOUTEN | B22F 3/1115 |
| 2020/0149269 | A1* | 5/2020 | Crump | D04B 1/00 |

FOREIGN PATENT DOCUMENTS

| | | | |
|---|---|---|---|
| WO | 2017092766 | A1 | 6/2017 |
| WO | 2020081645 | A1 | 4/2020 |

* cited by examiner

METHOD FOR PRODUCING A SHELL-LIKE OR PLATE LIKE SUPPORTING STRUCTURE

CROSS REFERENCE TO RELATED APPLICATIONS

This application is a national stage filing under Section 371 of International Application No. PCT/IB2021/058979, filed Sep. 30, 2021, published in English on Apr. 7, 2022, as WO 2022/070121 and which claims priority from Italian Patent Application No. 102020000023260 filed on Oct. 10, 2020, the entire disclosures of which are incorporated herein by reference.

FIELD OF THE INVENTION

The present invention relates to methods for providing shell-like or plate-like supporting structures, such as hulls or parts of watercraft or aircraft structures, in particular aircraft fuselage structures or wing or tail structures, or motor-vehicle bodies or their subassemblies, or again for example propeller blades or wind rotor blades, and supporting structures in general that have relatively thin walls, where it is necessary to combine characteristics of structural strength with characteristics of a high degree of lightness. Another possible application regards the dies or moulds used in the manufacture of structures of the type referred to above, for example dies for the manufacture of structures made of composite material.

In the present description and in the annexed claims the expression "shell-like or plate-like supporting structure" is used to refer to a structure constituted by one or more relatively thin panels, configured in the form of a closed or open shell, or also in the form of a plane plate, capable of performing a load-bearing function.

The invention finds particularly advantageous application in the production of shell-like or plate-like supporting structures that must also present hydrodynamic or aerodynamic characteristics, suited to movement in water or in air, such as watercraft hulls, aircraft structures, or motor-vehicle structures, and in general any other structure of the type referred to.

PRIOR ART

The conventional technique used for providing shell-like or plate-like supporting structures of large dimensions in general entails long and complex operations. To guarantee a greater stiffness and strength of such structures, which are characterized by walls of relatively small thickness, a lattice of stiffening ribs is usually provided, which can be glued, screwed, jointed, nailed, or riveted to the surfaces of the shells. Such secondary structures may in some cases jeopardise the external finish of the surfaces, which normally should be characterized by smooth and fair surfaces. Large structures made of composite material, such as those of the hulls of watercraft, are obtained for example using male or female dies, which are constituted by a framework covered with foamed panels, deposited on which are the carbon fibres or glass fibres that constitute the material of the final structure. In this case, where structures are to be provided that have reinforcement ribs, it is necessary to shape the die accordingly. However, it is problematical to obtain in this way ribs characterized by cross sections that present particular configurations or, for example, a hollow configuration. For hulls the shells of which are obtained using metal materials techniques of forming of metal plates are instead employed: the metal plates are bent, rolled, thermoformed, and then jointed to the reticular structures that constitute the skeleton of the hull itself. Similar techniques of construction are normally adopted for the creation of various aircraft components (fuselages, cockpit cells, wing surfaces, tails) or else for building motor-vehicle bodies. Shell-like or plate-like supporting structures of large dimensions are also obtained, for example, by means of gluing of slats or strips on supporting ribs using an extremely wide range of materials (for example, metal or wood). For manufacturing shell-like or plate-like supporting structures with stiffening ribs, there exist further techniques that range from milling of semi-finished products made of metal material (having thicknesses of up to some centimetres) to the so-called fibre-placement technique, whereby it is possible to spread long carbon fibres over a die to obtain objects made of composite material. For objects having a geometry prevalently presenting axial symmetry, the so-called thread-winding technique is for example used, whereby it is possible to wind a carbon fibre around a die that is set in rotation by a spindle. With this type of manufacturing process it is possible to obtain shell-like or plate-like supporting structures, stiffened by ribs with full section, with maximum dimensions of approximately one metre. Typically, all these methods are used to produce structures of the so-called isogrid or anisogrid type, which, by virtue of their lightness and stiffness, are routinely used for creating shell-like structures of tanks of large dimensions or else for producing objects in the aerospace sector. There moreover exist other techniques that can be used for manufacturing ribbed panels of small dimensions using dies made of metal or sand used for die-casting of objects made of thermoplastic or metal material, respectively.

In recent years, various additive-manufacturing technologies have been developed with increasing success, in particular for the production of objects of relatively small size. The term "additive manufacturing" is used herein to refer to a wide range of techniques, where an object is manufactured starting from 3D computer models by adding layers on top of one another (unlike traditional methodologies where stock is removed and where milling machines or lathes are employed) using metal materials, plastic materials, or composite materials. A specific type of additive manufacturing is the FDM (Fused Deposition Modelling) technique, where an object is created layer by layer with the use of a dispensing head that deposits material in a continuous way along a pre-set path.

Up to the present, however, additive-manufacturing technology has not found concrete application in the production of large-sized shell-like or plate-like supporting structures of the type to which the present invention refers, mainly on account of the impossibility of achieving simultaneously the characteristics of lightness and strength that are necessary in structures of this sort, in particular in the case of shell-like or plate-like supporting structures for hulls of watercraft, aircraft structures, or motor-vehicle structures and in general for any other structure of the type discussed above.

Object of the Invention

The object of the present invention is to propose new techniques of production for shell-like or plate-like supporting structures of large dimensions, such as hulls of watercraft or aircraft structures or motor-vehicle structures, that will prove considerably simpler and faster than conventional techniques used up to the present, at the same time guaranteeing the necessary features of strength and lightness of the structure obtained.

A further object of the invention is to propose new techniques of production of shell-like or plate-like supporting structures of large dimensions that will guarantee that smooth and fair surfaces are obtained, suited for application to the hulls of watercraft or aircraft structures or motor-vehicle structures, or again propeller blades or wind rotor blades, where it is necessary to obtain surfaces with good hydrodynamic or aerodynamic characteristics.

A further object of the invention is to achieve the aforesaid aims with techniques that will allow for the use of equipment characterized by high operating flexibility, in the sense of being readily adaptable to providing different structures without the need to modify the manufacturing equipment and consequently with a considerable reduction in the production costs.

SUMMARY OF THE INVENTION

With a view to achieving one or more of the aforesaid objects, the subject of the invention is a method for producing a shell-like or plate-like supporting structure of the type referred to above, comprising the step of providing one or more panels that are to define the shell-like or plate-like supporting structure, said method being characterized in that each panel is formed employing an additive-manufacturing technology, with a lattice of stiffening ribs on at least one face of the panel.

In the preferred embodiment of the method according to the invention, the stiffening ribs of each panel are made of a single piece with the panel, simultaneously with forming of the latter.

Even more preferably, at least part of the aforesaid stiffening ribs are made hollow.

Once again in the case of the preferred embodiment, the lattice of stiffening ribs comprises different dimensional orders of ribs so as to define a lattice of ribs of a first order and one or more lower orders of ribs that have progressively decreasing dimensions. For instance, it is possible to envisage a lattice of main ribs and lattices of secondary ribs arranged in areas delimited by the main ribs. The dimension of the main ribs in the direction orthogonal to the face of the panel is greater than the corresponding dimension of the secondary ribs. Likewise, it is possible to envisage lattices of tertiary ribs in the spaces comprised between the secondary ribs and, if necessary, further subclasses of ribs, with progressively decreasing dimensions.

According to a further preferred characteristic of the invention, each panel is formed using FDM (Fused Deposition Modelling) technology.

According to a further preferred characteristic, each panel is obtained by layers deposited on top of one another, each layer being obtained by moving a dispensing head that deposits a continuous thread of material, either according to a closed-loop path, which includes a forward stretch defining a first, smooth, face of the panel and a return stretch adjacent to the forward stretch including undulations that define hollow ribs on the second face of the panel, or according to a path between two opposite ends that is followed back and forth in the two directions to provide the different layers and includes loop-shaped stretches, which are defined with or without overlaying of the portions of thread of material corresponding to the start and end of each loop and form the hollow ribs following upon superposition of the layers.

According to further characteristics of the invention, the cavities of the hollow stiffening ribs are filled with additional reinforcement material, for example reinforcement resin or fibres and/or are used for the passage of cables or service ducts or as ventilation ducts, and/or are used to engage within them elements of connection between the panels.

In the method according to the invention, the panels can be obtained using different materials, for example polymeric material, composite material, metal material, cementitious material, or ceramic material.

Again, according to a further embodiment, one or more of the aforesaid panels, either singly or in the assembled condition, are used as cores of multilayer structures obtained by coating at least one of the faces of the panels with a covering layer, for example made of plastic material or composite material. To favour adhesion of the covering layer on the face of the panel bearing the ribs, the ribs may be designed in such a way as to present a curved surface connecting each rib to the corresponding face of the panel.

According to a specific application of the present invention, the subject of the latter is a watercraft hull (or even other parts of a watercraft), comprising a shell-like or plate-like structure, formed by panels connected together, obtained using the method of the invention, wherein at least some of said panels have a lattice of stiffening ribs on at least one face of the panel, wherein at least some of said ribs are hollow, wherein the cavities of some of said hollow ribs are filled with additional reinforcement material, for example reinforcement resin or fibres, and/or wherein some of said hollow ribs are used for the passage of cables or service ducts or as ventilation ducts, and/or wherein some of said hollow ribs are used to engage within them elements of connection between the panels, and/or wherein one or more of said panels, either singly or in the assembled condition, are used as cores of multilayer structures obtained by coating at least one of the faces of the panels with a covering layer, for example made of plastic material or composite material.

Further specific applications of the present invention refer to shell-like or plate-like supporting structures for aircraft, for example for an aircraft fuselage or a wing or tail of an aircraft, or for motor-vehicle bodies or their subassemblies.

A further particularly advantageous application of the method according to the invention regards propeller blades or wind rotor blades.

It is evident, however, that the invention is of general application and can be advantageously used in the production of any shell-like or plate-like supporting structure in which it is necessary to obtain good characteristics of lightness and structural strength, with simple and fast operations and with the use of equipment readily adaptable to different applications.

DETAILED DESCRIPTION OF PREFERRED EMBODIMENTS

Further characteristics and advantages of the invention will emerge from the ensuing description with reference to the annexed drawings, which are provided purely by way of non-limiting example and in which.

Figure 1:
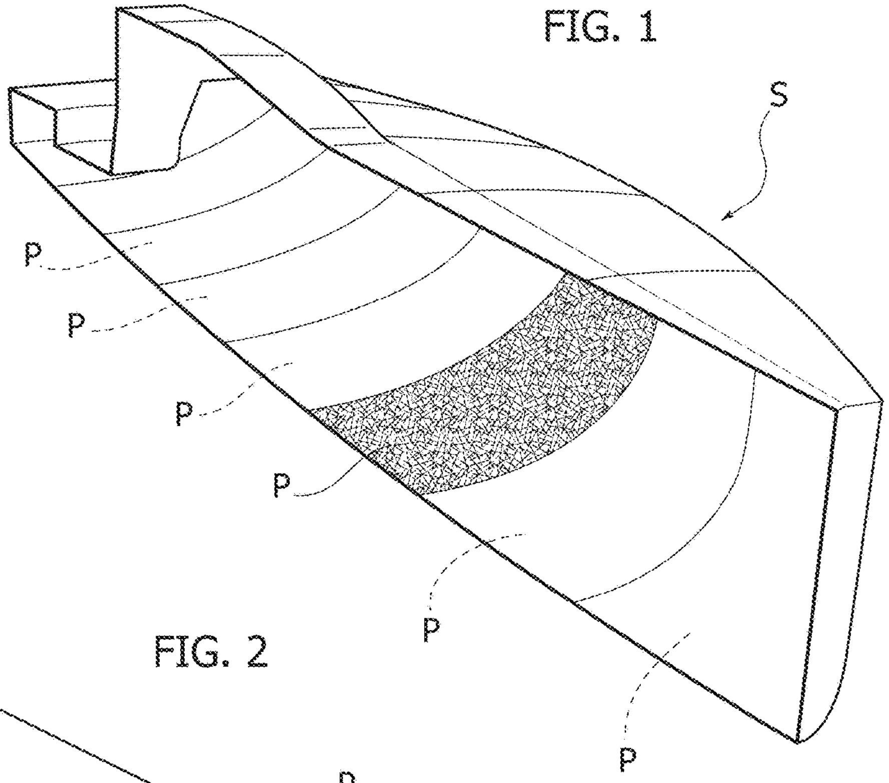
FIG. 1 is a perspective sectioned view of a boat hull obtained using the method according to the invention.
Figure 2:
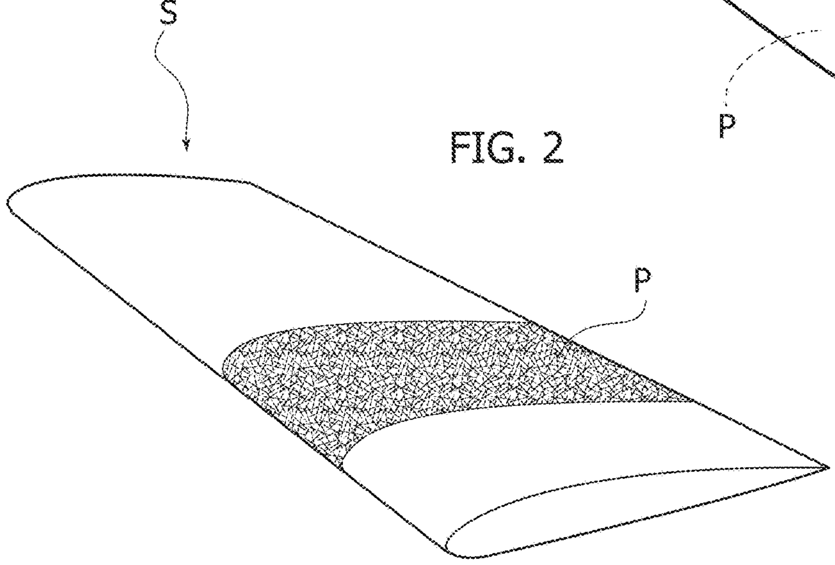
FIG. 2 is a perspective view of a wing profile obtained using the method according to the invention.
Figure 3:
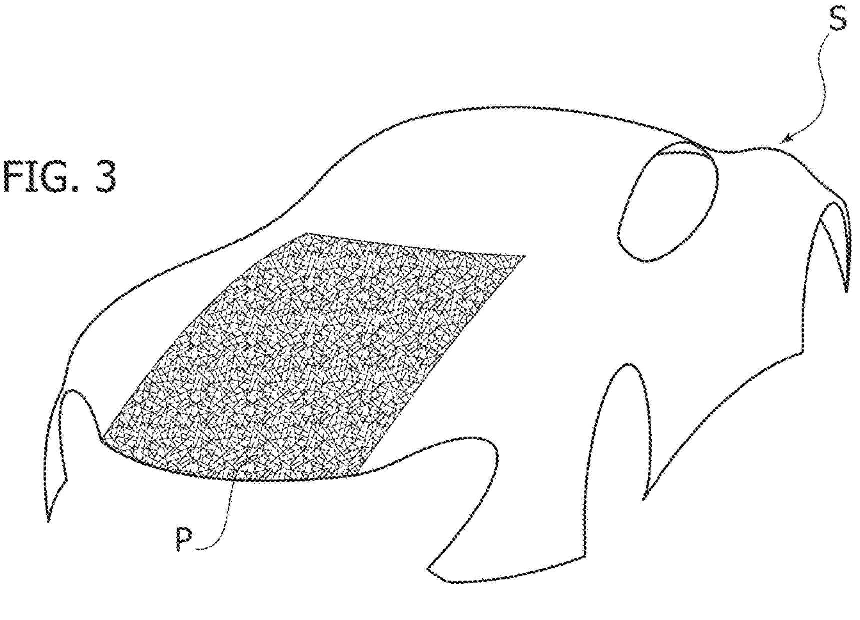
FIG. 3 is a schematic perspective view of a motor-vehicle body including a panel obtained using the method according to the invention.

FIGS. 1-3 show three examples of shell-like supporting structures, of large dimensions, which can be obtained using the method according to the present invention. FIG. 1 refers to the case of a shell-like structure S of a hull for a watercraft, in the specific case a racing boat. FIG. 2 refers to the case of a wing or tail of an aircraft. FIG. 3 refers to the case of a motor-vehicle body, in particular a sports car.

In all of the aforesaid examples, there is the need to provide shell-like supporting structures that will present the necessary characteristics of structural strength, but that at the same time are extremely light and suited to configuring bodies with the necessary hydrodynamic or aerodynamic characteristics.

In all the aforesaid cases, the shell-like supporting structure, denoted as a whole by S, is constituted by one or more panels P, which are connected together and are obtained using the method that will be described hereinafter, with a curved configuration having a single or double curvature and with a lattice of stiffening ribs on the inner face of the panel, i.e., on the side of the concavity of the panel.

FIG. 1 shows a perspective view sectioned according to a vertical longitudinal plane, visible in which is just one half of the hull and the superstructure thereof. One of the panels P is illustrated with its inner surface bearing a lattice of stiffening ribs. The remaining panels P are represented only schematically for convenience of illustration, but also these are to be configured with a lattice of stiffening ribs, according to what will be described in greater detail in what follows.

In the case of FIG. 2, which refers to a wing or tail of an aircraft, for convenience of illustration a single panel P has been represented, but of course the entire structure S illustrated in FIG. 2 is to be understood as being defined by a plurality of panels P connected together. As will be seen in what follows, it is not even ruled out that the structure of the type illustrated in FIG. 2 can be made of a single piece using the method according to the invention. Of course, also in the case of the structure S illustrated in FIG. 2, the lattice of the stiffening ribs is provided on the inner face of the panel P, the outer face having a smooth surface suited to obtaining the desired aerodynamic features. The same applies to the panel P forming part of the motor-vehicle body illustrated in FIG. 3.

Figure 4:
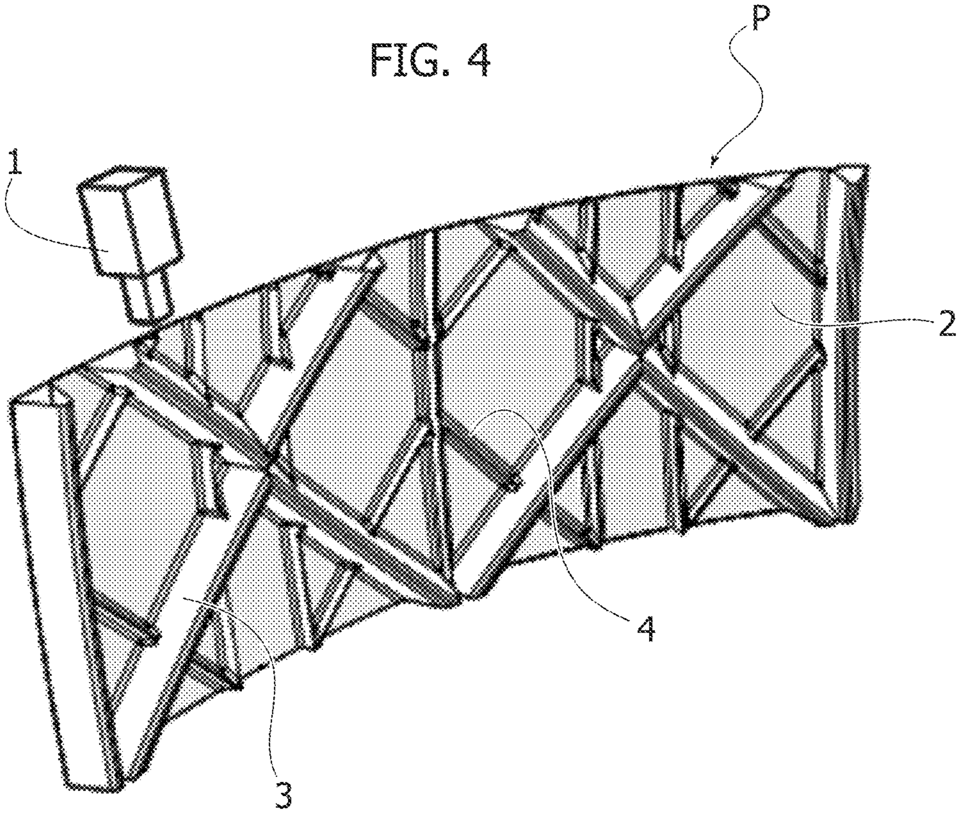
FIG. 4 is a perspective view that provides a schematic illustration of application of the method according to the invention to the production of a thin panel, of large dimensions, with a lattice of stiffening ribs.
Figure 5:
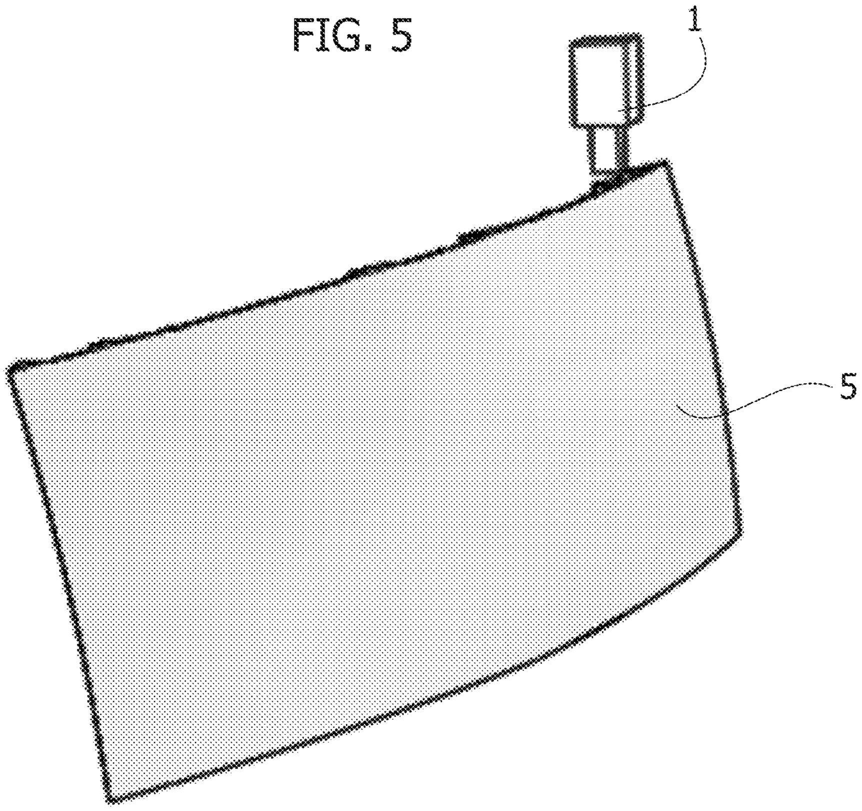
FIG. 5 is a perspective view that shows the panel represented in FIG. 4 from the side of the panel presenting a smooth surface.

FIGS. 4 and 5 are schematic perspective views of a panel P obtained using the method according to the invention. This method envisages the use of an additive-manufacturing technology in order to obtain, layer by layer, the configuration of the panel P illustrated in FIGS. 4 and 5.

The specific example illustrated refers to adoption of an FDM (Fused Deposition Modelling) technique that envisages the use of a dispensing head 1 that deposits a continuous thread of the material that is to constitute the panel (for example, metal material, or polymeric material, or composite material, or cementitious material, or ceramic material). Each layer of the panel P is obtained with a movement of the dispensing head 1 along a pre-set path, as will be described in greater detail in what follows, in order to define a panel P with a smooth outer face (FIG. 5) and an inner face bearing a lattice of stiffening ribs.

The additive-manufacturing technique, and in particular the FDM technique, is in itself of a known type. For this reason, the details regarding the machines used for its application are here omitted since they may be of any known type. Elimination of these details from the drawings moreover renders the latter more readily and more easily understandable.

It should moreover be noted that the FDM technique is here indicated merely as preferred solution, without excluding adoption of any other additive-manufacturing technology, for example via powder deposition.

With reference now to the preferred example of embodiment illustrated in FIGS. 4 and 5, the panel P is obtained with its inner face bearing a lattice of main ribs 3 and a further lattice of auxiliary ribs 4, which extends in the areas 2 delimited between the main ribs 3. Once again with reference to the preferred example of embodiment illustrated here, the dimension of the main ribs 3 in the direction orthogonal to the face of the panel P is greater than the dimension of the auxiliary ribs 4. As already mentioned, the panel may be provided with more than two dimensional orders of ribs. For instance, it is possible to provide a tertiary lattice of ribs between the secondary ribs and further dimensional suborders of ribs.

The configuration and arrangement of the ribs 3, 4 may vary widely according to the desired characteristics of strength of the panel P. The geometry of the ribs can in particular be designed and optimized by using numeric-modelling techniques.

Figure 6:
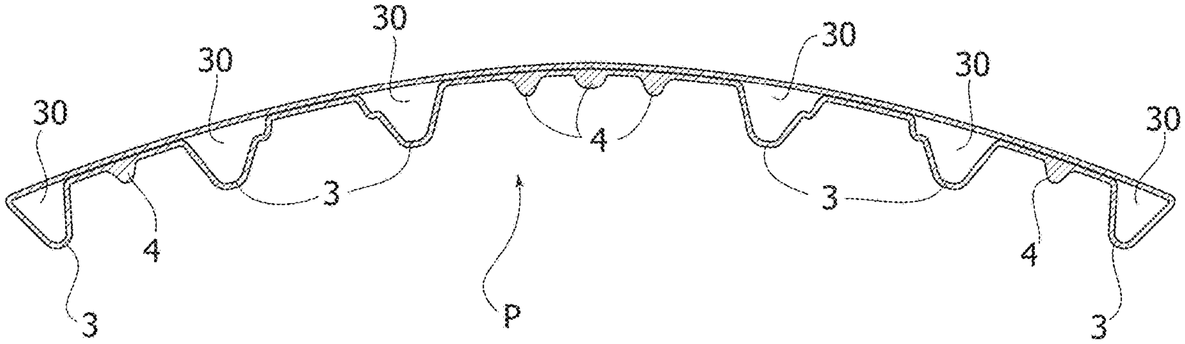
FIG. 6 is a cross-sectional view at an enlarged scale of the panel illustrated in FIGS. 4 and 5.

Once again with reference to FIGS. 4 and 5 and also to FIG. 6, which is a cross-sectional illustration of the panel P in a horizontal plane (with reference to the drawings), the auxiliary ribs 4 are full ribs, whereas the main ribs 3 are hollow ribs, each having a cavity 30.

According to a further preferred characteristic of the invention, the ribs of the panel P are made of a single piece with the panel, simultaneously with forming of the panel using an additive-manufacturing technology.

FIGS. 7-24 show different techniques of deposition of the continuous thread, corresponding to different modes of moving of the dispensing head 1 of the FDM machine and/or to different configurations of the stiffening ribs.

Figure 7:
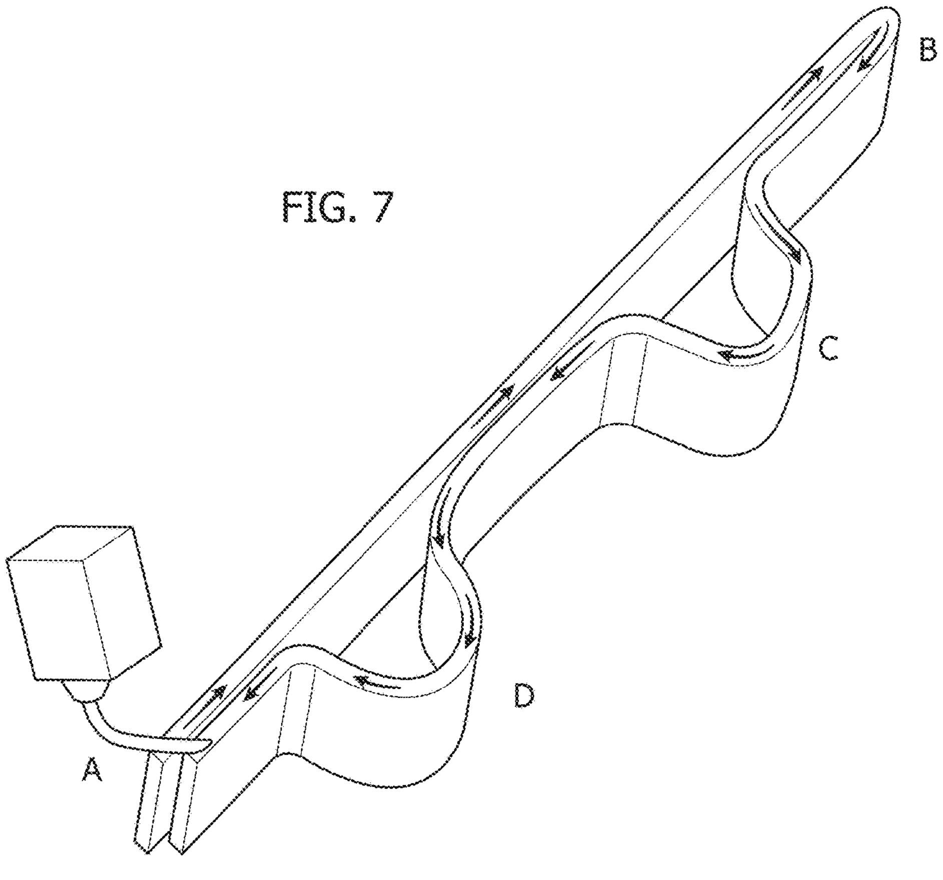
FIGS. 7-24 are perspective views that illustrate schematically different configurations of a ribbed panel obtained in different embodiments of the method according to the invention.

FIG. 7 refers to a mode whereby the dispensing head 1 moves in a plane X-Y, for each level Z envisaged, depositing a thread of the material that is to constitute the panel according to a closed-loop path defining the profile of the cross section of the piece, with a forward stretch (from A to B) that defines the smooth outer face of the panel and a return stretch (from B to A) in which the dispensing head 1 deposits a second thread, adjacent to the first except in undulated portions C, D, which are to define the hollow stiffening ribs on the inner face of the panel P. Once one layer is completed, the head 1 deposits the next layer by repeating the same path. In this way, the panel P is obtained, guaranteeing a perfect continuity of the finish both of the smooth outer face and of the inner face bearing the hollow stiffening ribs.

Figure 8:
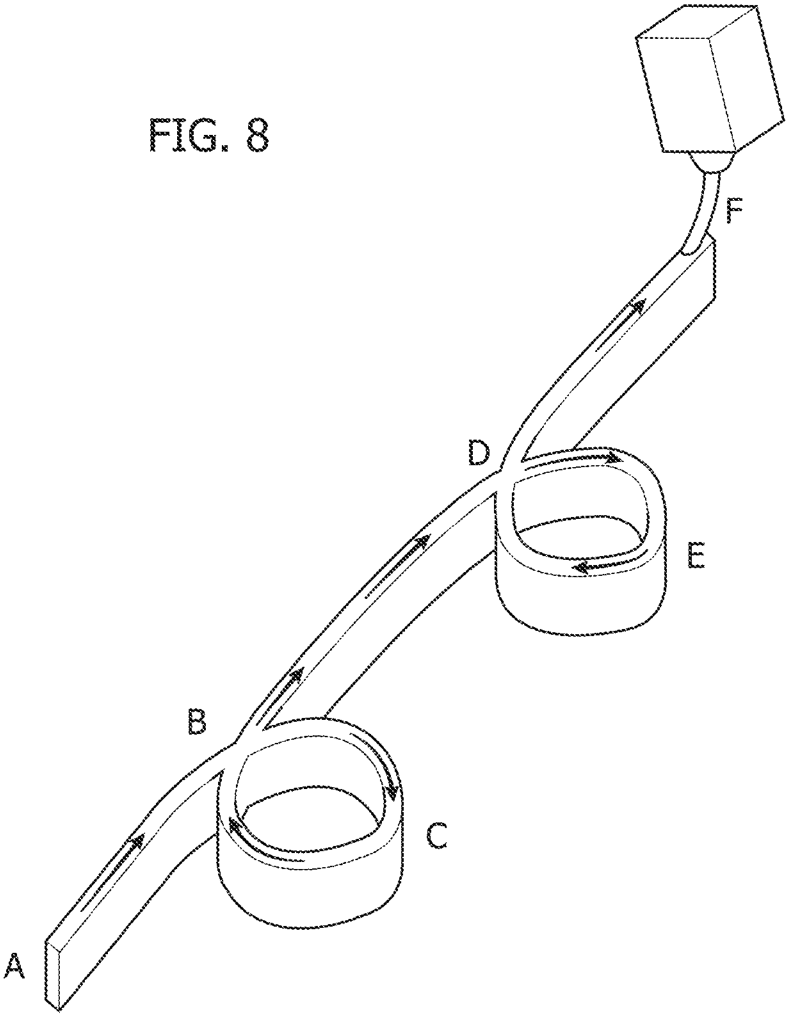

FIG. 8 describes a second methodology in which the successive layers of the panel P are obtained by a movement of the dispensing head 1 along one and the same path, back and forth in the two opposite directions (from A to F and then from F to A). The path includes, at the points B and D, loop-shaped stretches C and E that define the hollow stiffening ribs on the inner face of the panel. Following upon movement of the head 1, there occurs overlaying of the portions of thread corresponding to the start and end of each loop.

A first advantage of this second methodology consists in the possibility of providing structures with the wall of the shell having a thickness exactly equal to that of the thread deposited and hence having a thickness smaller than that of structures that can be obtained using the method illustrated in FIG. 7. The pieces obtained using the method represented in FIG. 8, given the same shape and dimensions, are thus lighter than the ones that can be obtained using the method of claim 7. Moreover, since the times between two successive passes of the dispensing head are halved, it is possible to keep the threads relatively hotter and increase their adhesion during the step of gradual cooling of the piece (curing). The greater adhesion between the layers enables improvement of the characteristics of strength of the pieces, above all in the directions that are intrinsically weaker as a result of the manufacturing process (for example, in the direction Z). In these directions, in fact, there may be phenomena of de-lamination between the layers on account of poor adhesion between them. Notwithstanding the undoubted advantages of the methodology represented in FIG. 8 over the one represented in FIG. 7, it is necessary on the other hand to consider that the method of FIG. 8 leads to obtaining a structure having an outer surface that presents a discontinuity of shape at the points B and D. This aspect may, however, be at least partially mitigated by the fact that at the points B and D approximately twice the amount of the material is deposited (during formation of one and the same layer at a given height along Z). This material is subsequently compressed by the new thread that is deposited during the next pass of the dispensing head (to form the next layer). This compression and expansion of the first layer, which is still hot and soft, in fact enables partial compensation of the trough formed by the depression forming in the outer face of the structure at the points B and D. In general, in the case of the method represented in FIG. 8, the deposition paths need always to be closely studied through an optimization process that will take into account the geometries, paths, and thicknesses of the thread to be deposited. It is moreover possible to correct further the effect of the aforesaid irregularities of shape by applying covering layers (for example, made of composite material) on the outer face of the shell, by means of further processes after the panel P has been obtained.

Figure 9:
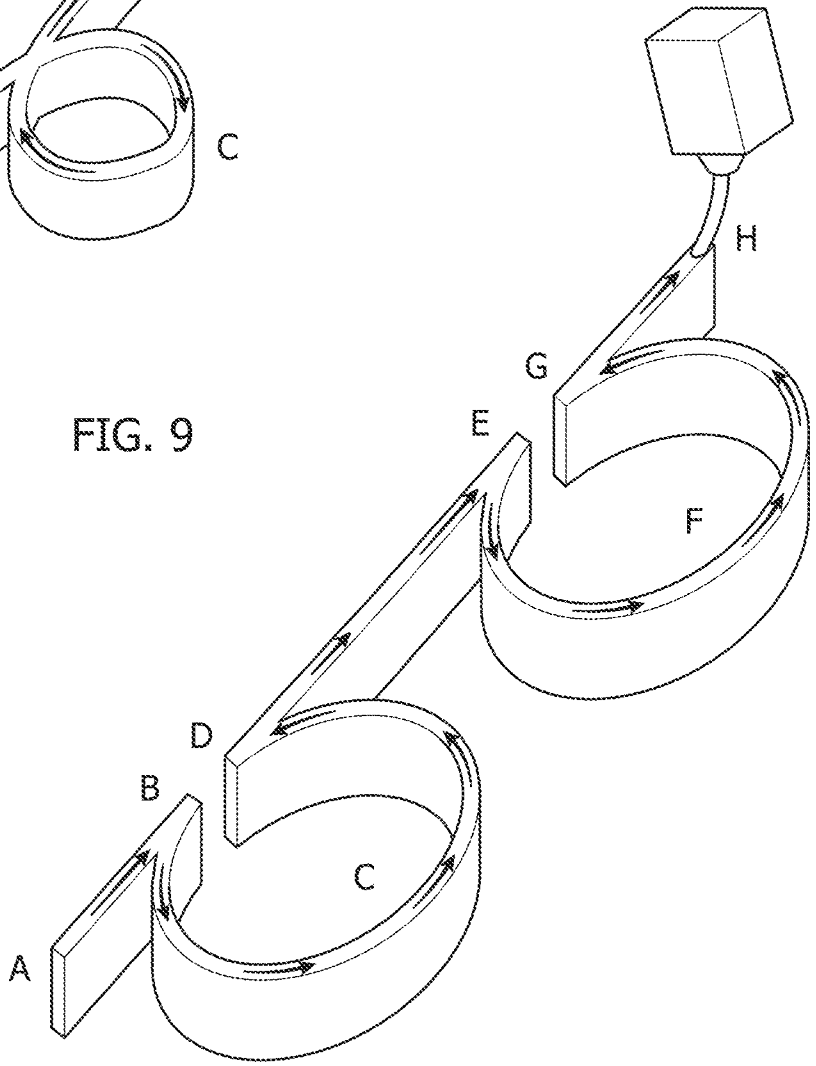

The methodology illustrated in FIG. 9 envisages that the dispensing head 1 forms each layer by moving alternately first forwards in the direction from a point A to a point H, and then back from a point H to a point A, following the path illustrated. In this case, on the inner face of the panel hollow stiffening ribs are obtained, of large dimensions, by getting the dispensing head to follow the loop-shaped paths B-C-D and E-F-G. Unlike the methodology represented in FIG. 8, in this case there is no overlaying of thread during formation of one and the same layer of the panel. FIG. 9 shows gaps between the points B and D and between the points E and G, the dimensions of which have been exaggerated for convenience of representation of the path followed. In practice, these gaps are closed. In this case, the dispensing head then follows again same path in the opposite direction after it has been raised in height in order to form the next layer. A first advantage of the methodology represented in FIG. 9 as compared to the one represented in FIG. 7 has already been described for the method illustrated in FIG. 8 and consists, that is, in the possibility of providing lighter structures, with walls of the shell that are thinner. Moreover, also in this case, it is possible to keep the threads deposited relatively hotter than in the case of the pieces produced using the method represented in FIG. 7, and improve the final mechanical characteristics of strength of the pieces. The method represented in FIG. 9, as compared to the method illustrated in FIG. 8, presents the main advantage of eliminating, at least potentially, the problem of the concavities localized on the outer face of the shell and of reducing the problem of accumulation of deposited material at the intersection between paths at the same height along Z. In the method illustrated in FIG. 9, it should on the other hand be taken into account that the welds at the gaps B, D and E, G may be weaker than what it is possible to achieve using the method represented in FIG. 8. Moreover, the sharp reversals of direction in the movement of the dispensing head 1 at the points B, D, and G may render more complex the system of control of movement of the dispensing head 1.

Figure 10:
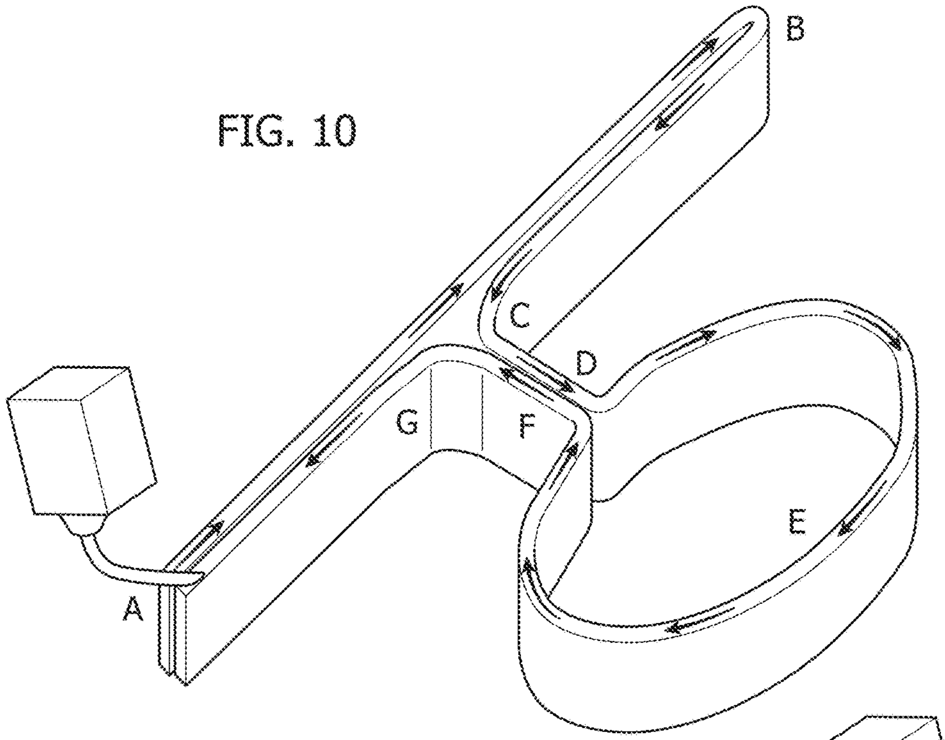

FIG. 10 shows a further example of technique of the type illustrated in FIG. 7, where the dispensing head moves according to a closed-loop path. In this case, the dispensing head covers a first stretch from A to B that defines the smooth outer surface of the structure, and then returns from B to A remaining adjacent to the stretch already deposited, except where it moves away therefrom in a central area of the panel according to the path C-D-E-F-G illustrated in FIG. 10, configured in such a way as to define a flat stem that widens then into a hollow rib.

Figure 11:
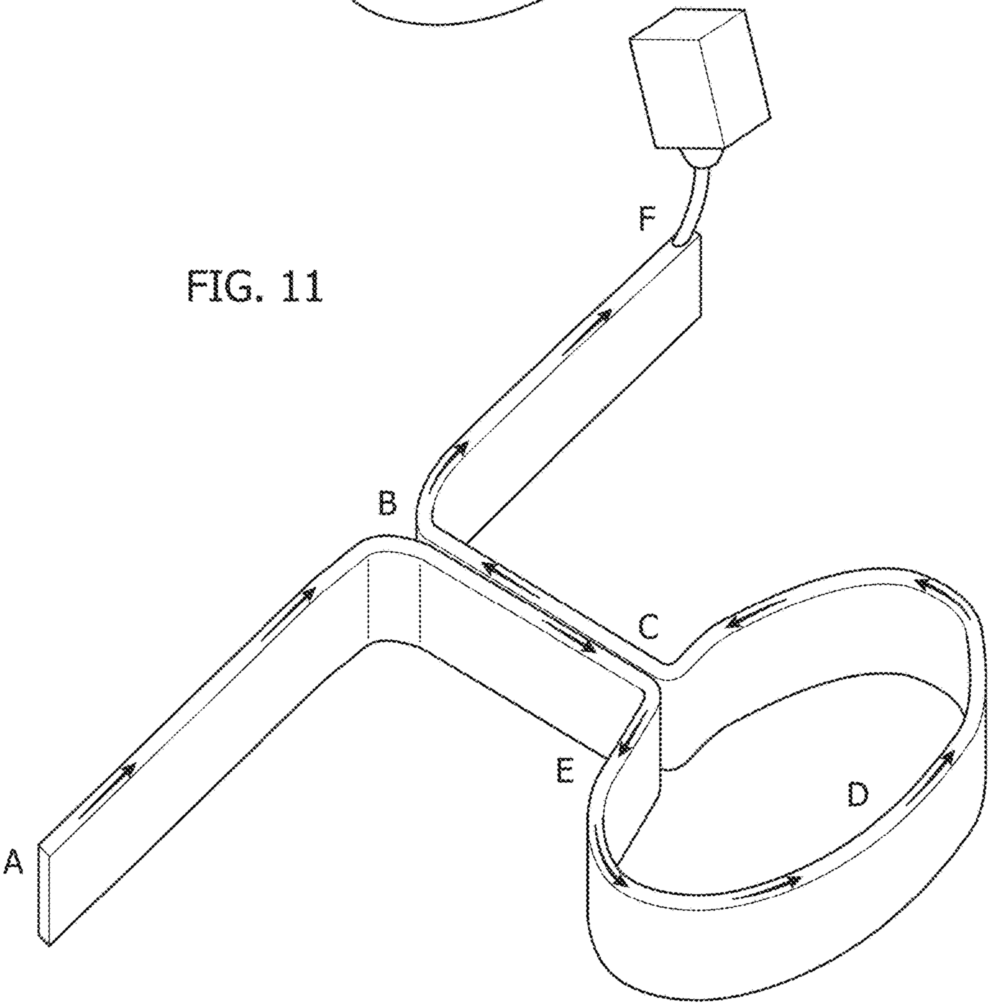
Figure 12:
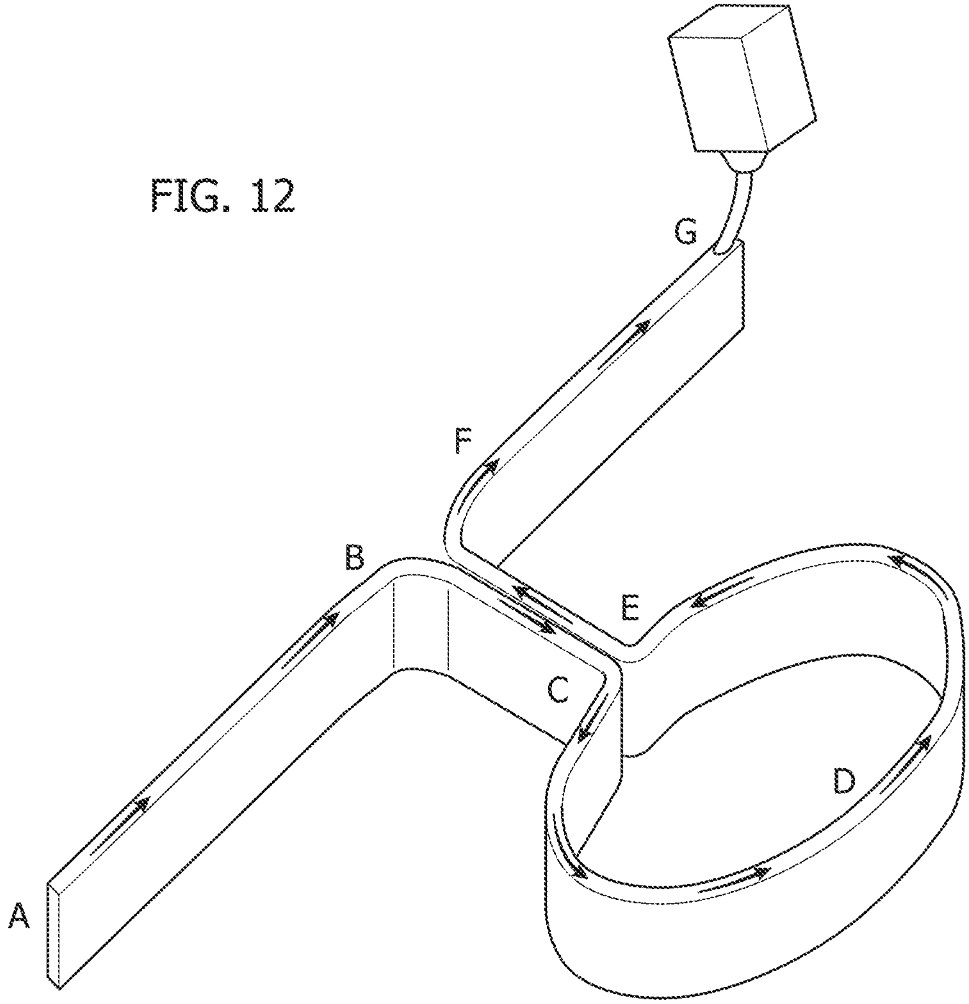

FIG. 11 shows an example in which a configuration is obtained similar to the one represented in FIG. 10, but with a technique of the same type as the one represented in FIG. 8. In this case, the path of the dispensing head 1 to define each layer develops from point A to point B, then defines a loop according to the path C-D-E, and then runs adjacent to itself up to point B and finally reaches point F. The next layer is formed with a reverse movement of the dispensing head.

FIG. 12 shows once again a structure having the configuration similar to the one represented in FIGS. 10 and 11, but obtained with a technique of the same type as the one illustrated in FIG. 9, with a movement of the dispensing head according to the path A-B-C-D-E-F-G. Also in this case, the next layer is obtained with a reverse path of the dispensing head.

Figure 13:
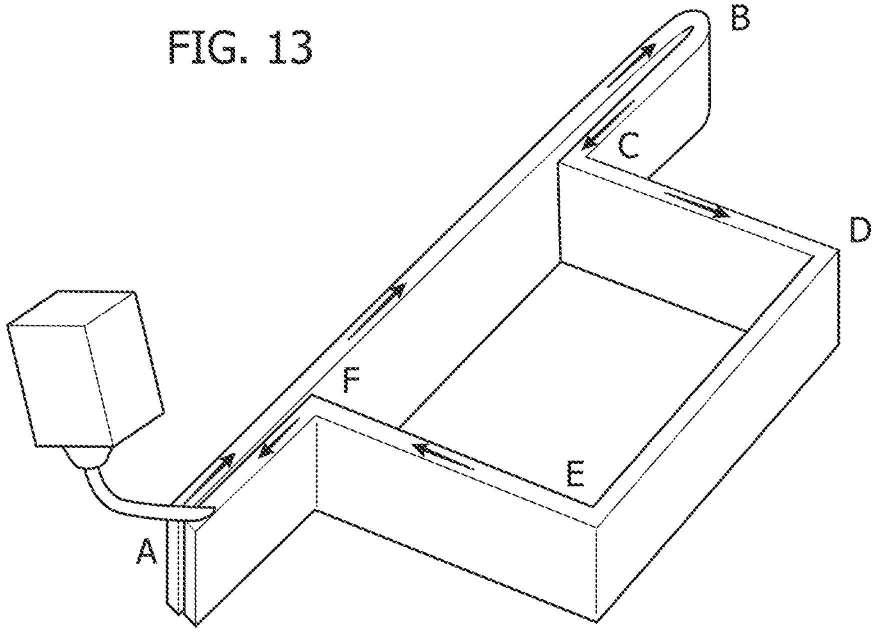

FIG. 13 shows a further example in which the technique illustrated in FIG. 7 is used to provide a different structural geometry, with a stiffening rib of large dimensions and with quadrangular section. Each layer is formed with a closed-loop movement of the dispensing head 1 according to a path A-B-C-D-E-F-A.

Figure 14:
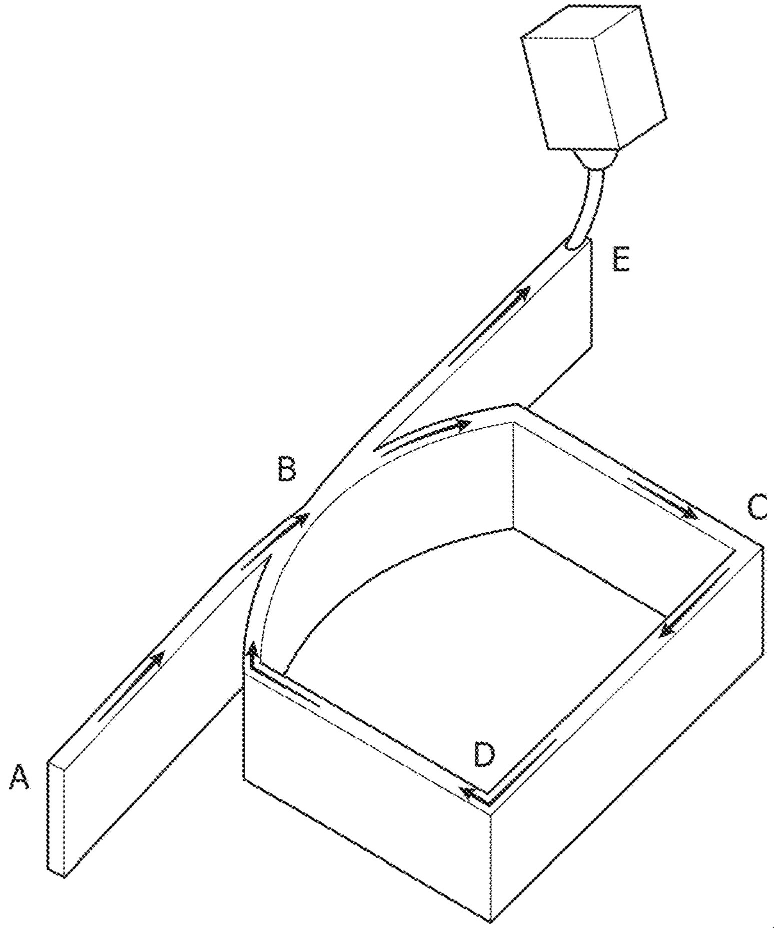

FIG. 14 shows a further example of structure that can be obtained using the same method as the one represented in FIG. 8, where each layer is formed with a movement of the dispensing head that goes from an end A to an end E, passing through the points B, C, D (loop-shaped conformation and overlaying of the thread at point B). The next layer is obtained with a movement of the dispensing head in the reverse direction.

Figure 15:
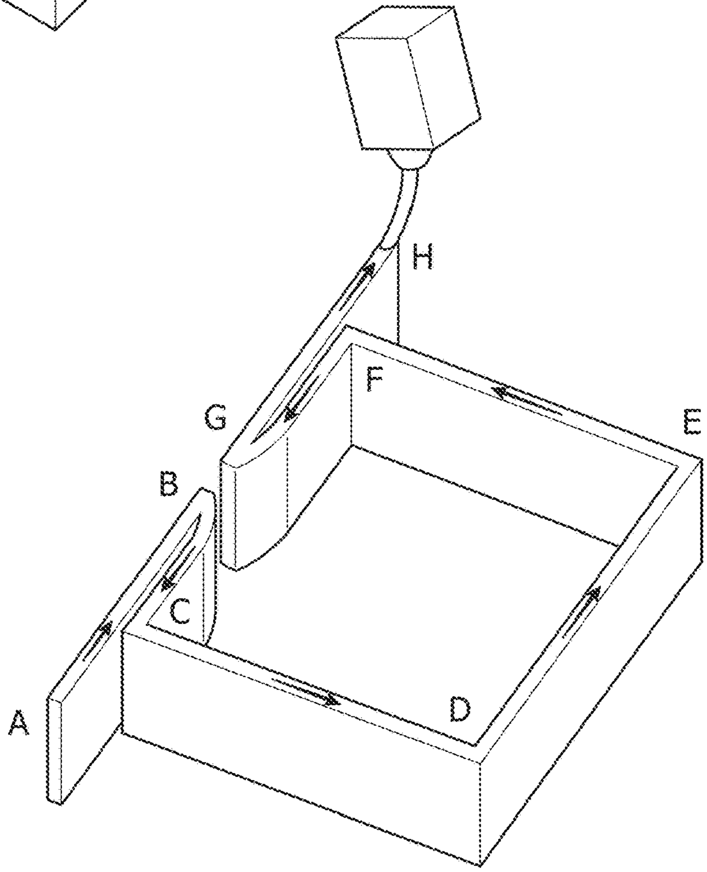
Figure 16:
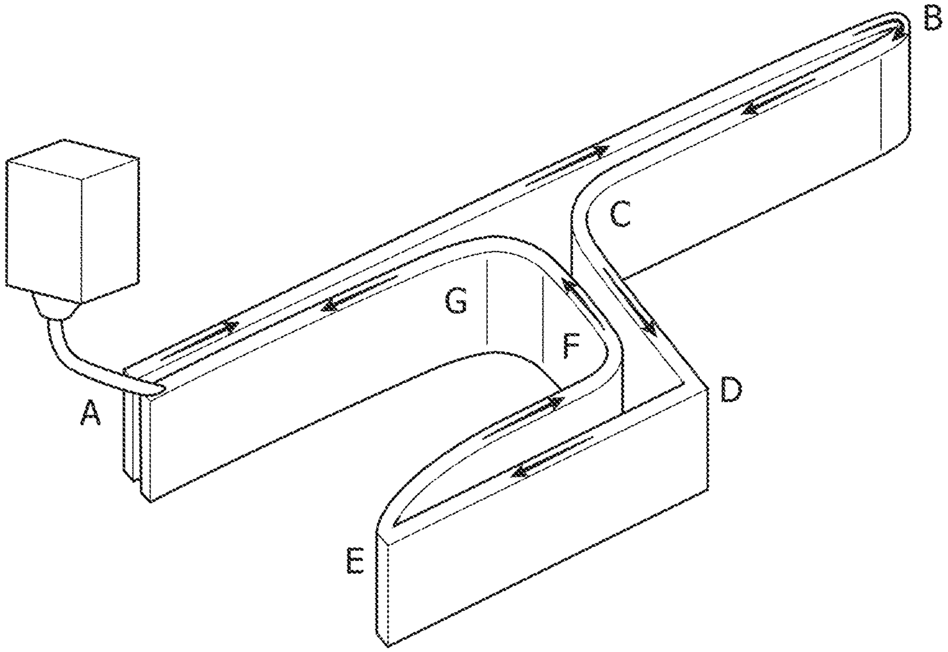
Figure 17:
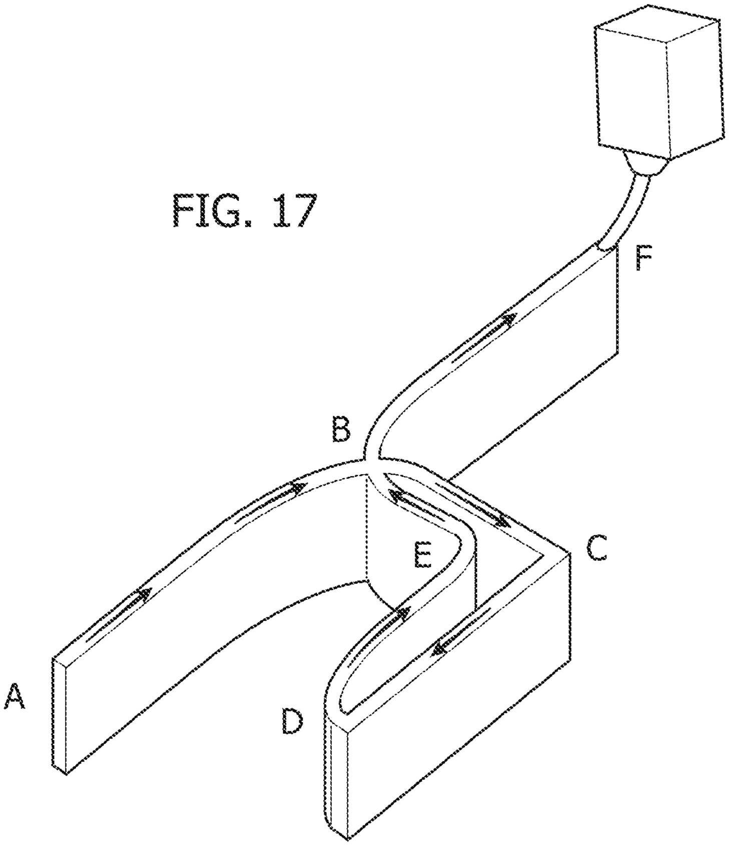
Figure 18:
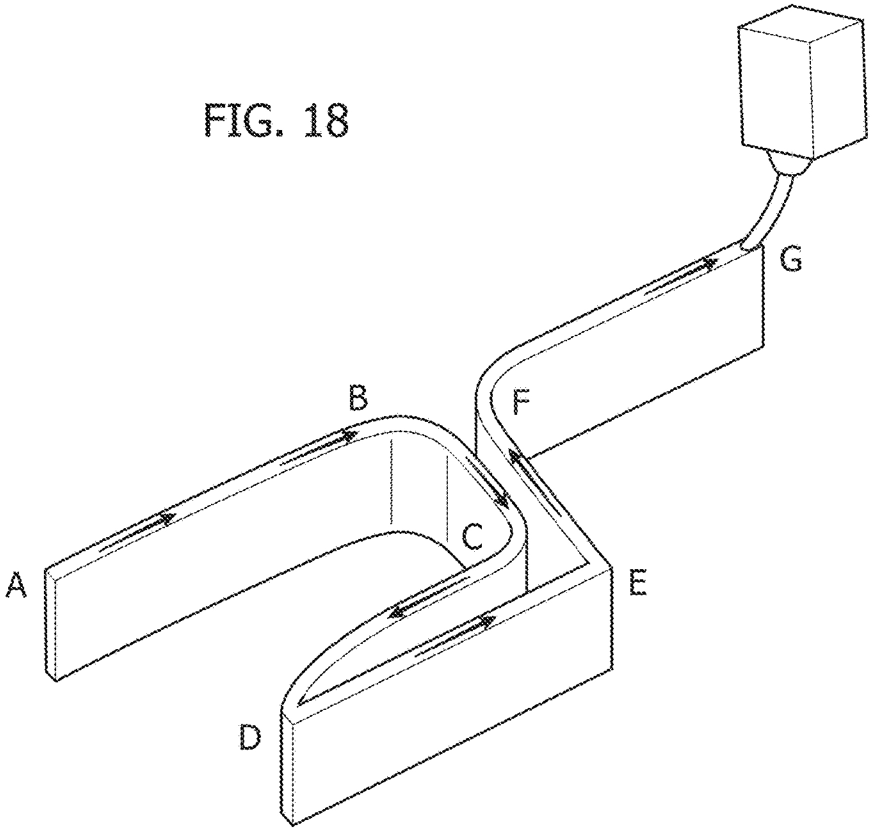
Figure 19:
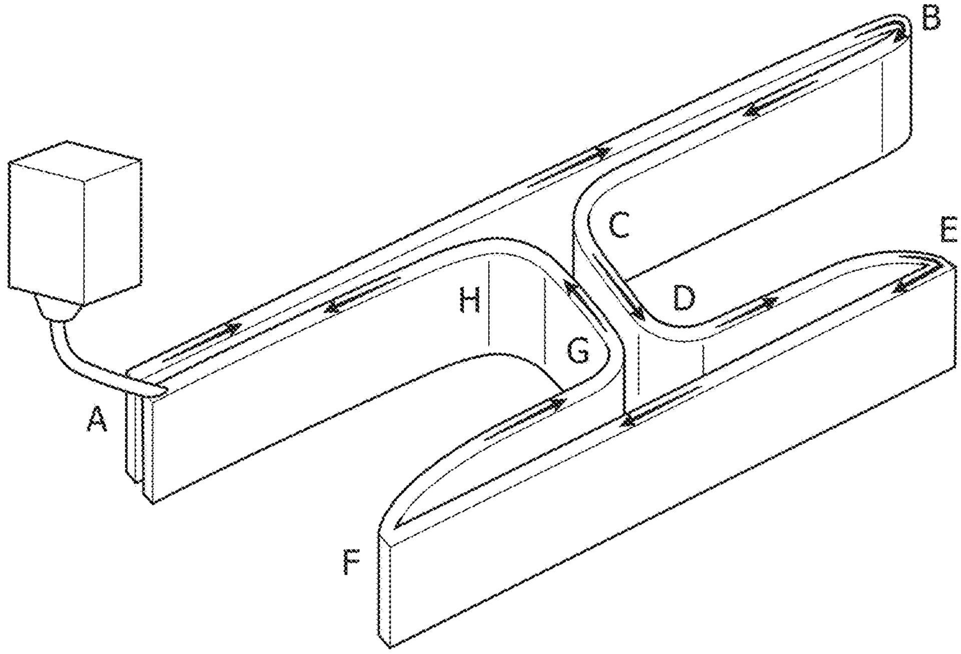
Figure 20:
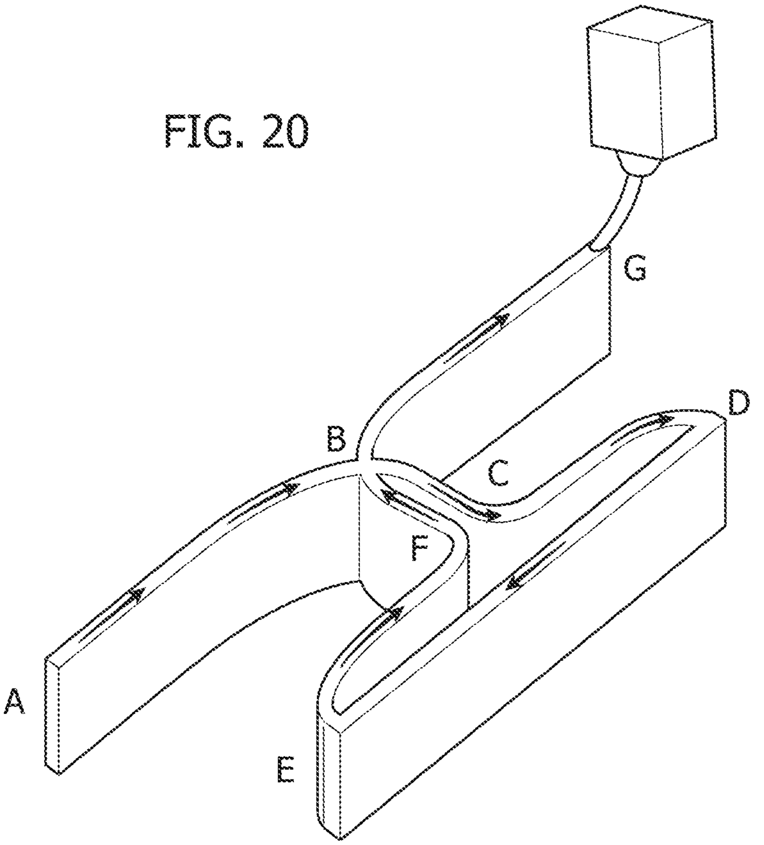
Figure 21:
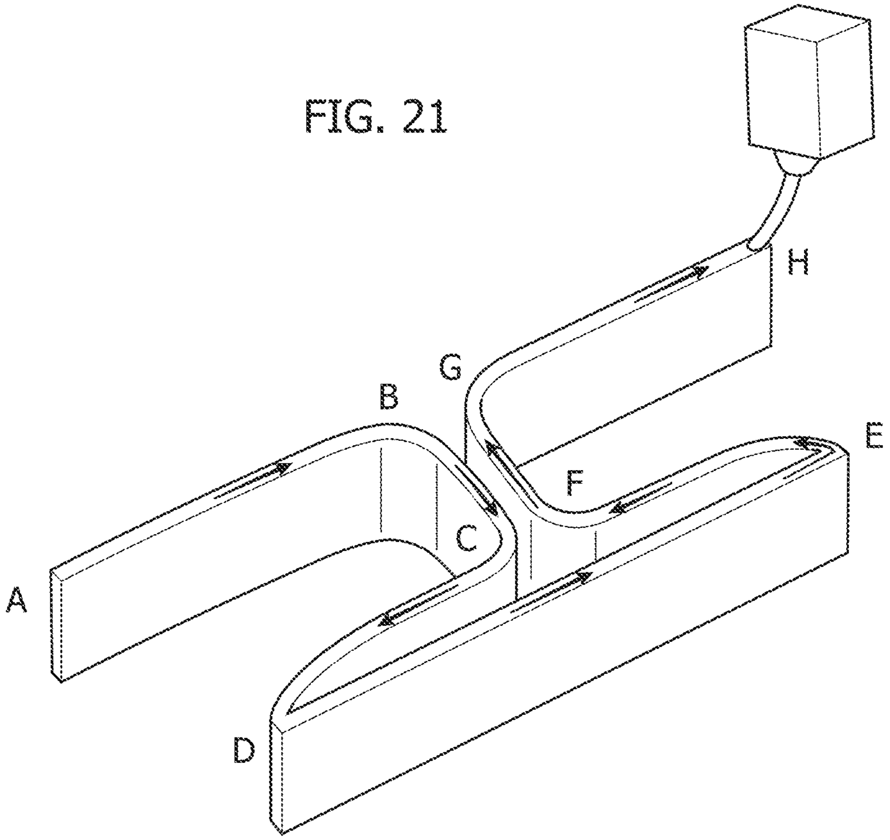

FIG. 15 is yet a further example of technique of the type represented in FIG. 9 to provide a different geometry of the structure.

FIGS. 16, 17, 18 once again show examples of application of the techniques represented in FIGS. 7, 8, 9 to provide a structure in which the stiffening rib has an L-shaped configuration, with a first stretch projecting from the central portion of the panel and a second stretch orthogonal to the first stretch and projecting in cantilever fashion therefrom.

Figure 22:
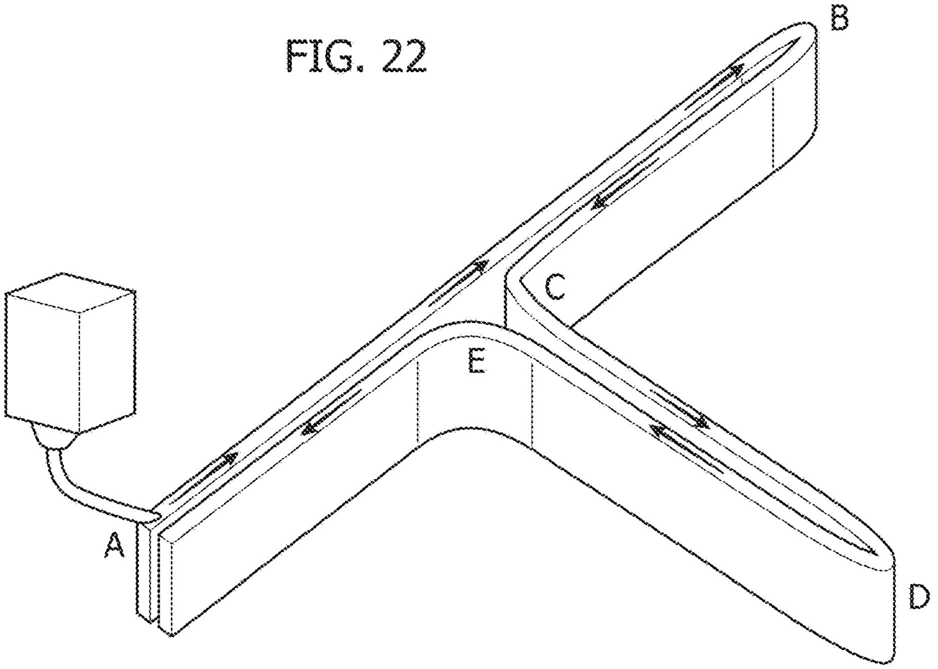
Figure 23:
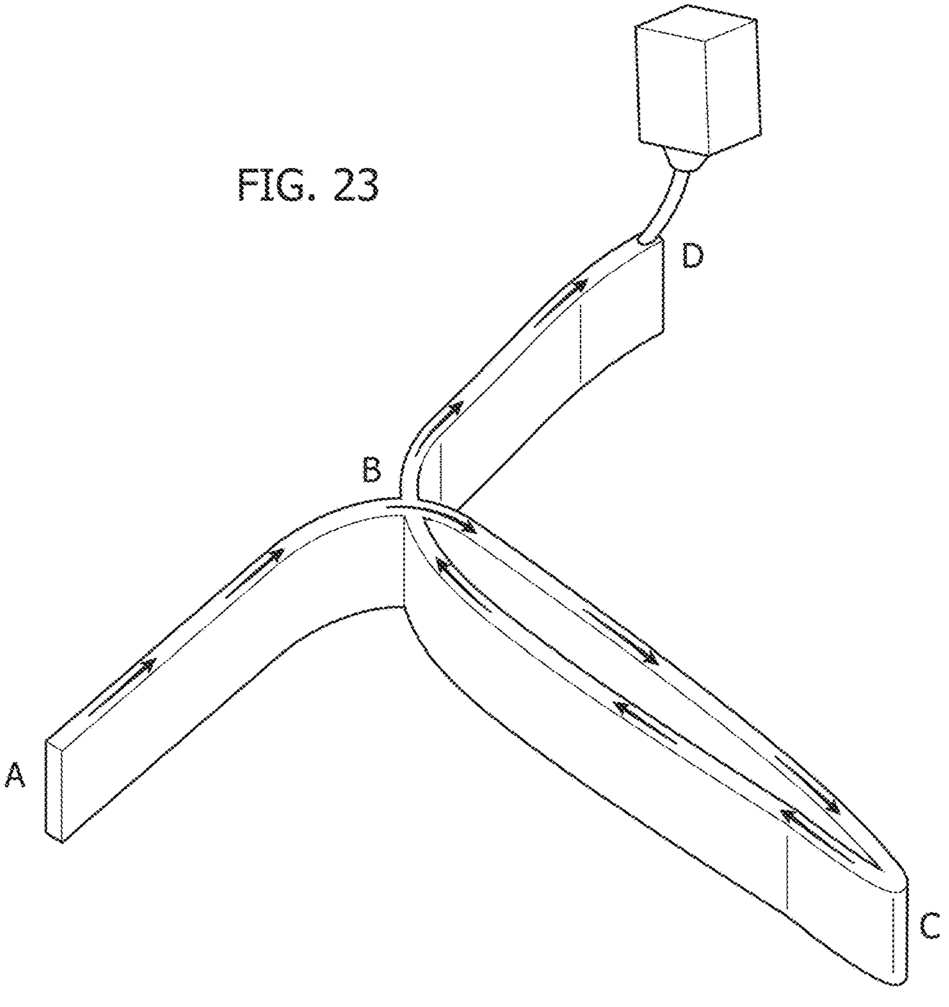
Figure 24:
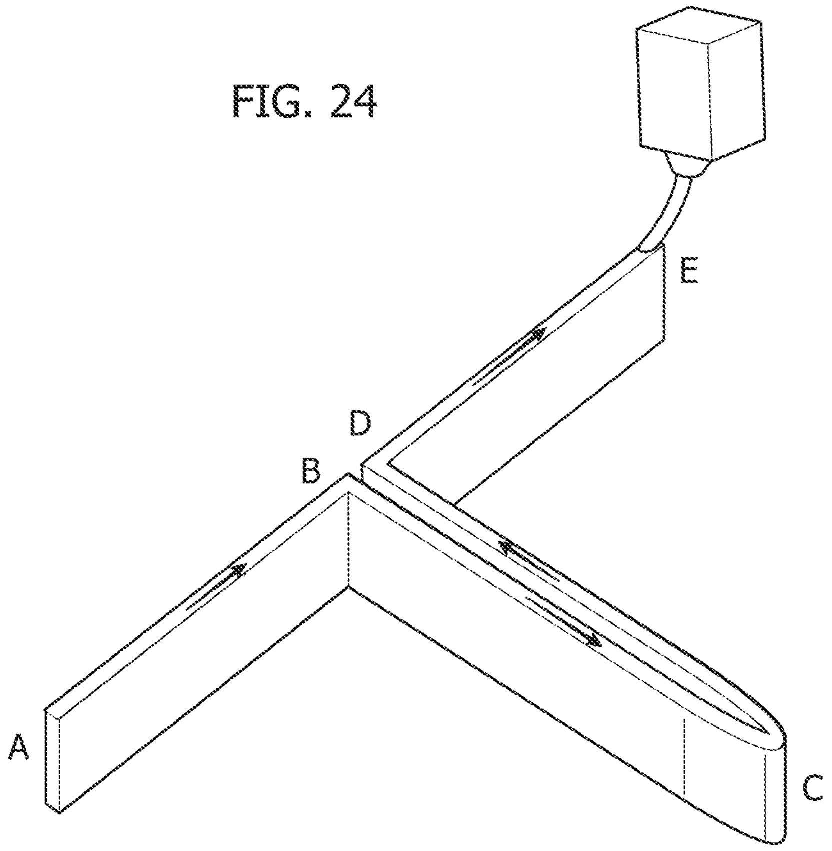

Further examples of application of the techniques represented in FIGS. 7, 8, 9 are illustrated in FIGS. 19, 20, 21, 22, 23, 24 with reference to structures in which the stiffening rib has a T shape (FIGS. 19-21) or is in the form of a single fin orthogonal to the main body of the panel (FIGS. 22-24).

Figure 25:
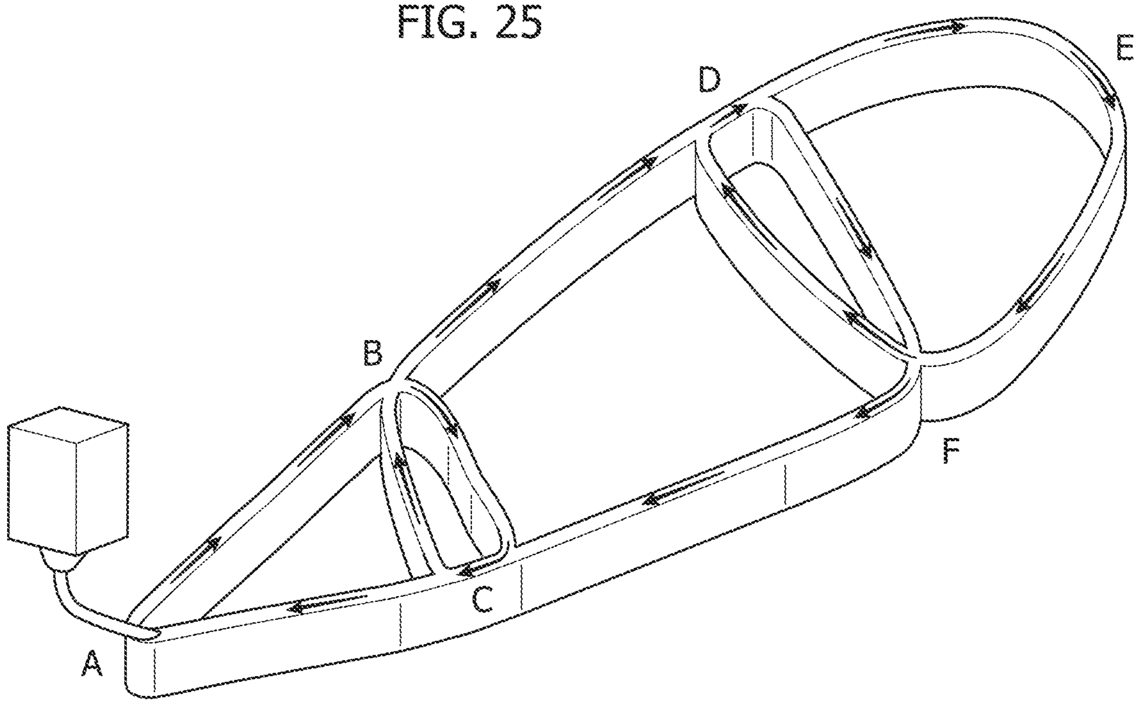
FIGS. 25 and 26 are schematic perspective views that illustrate two further embodiments of the method according to the invention that can be applied to obtain further configurations of shell-like structures.
Figure 26:
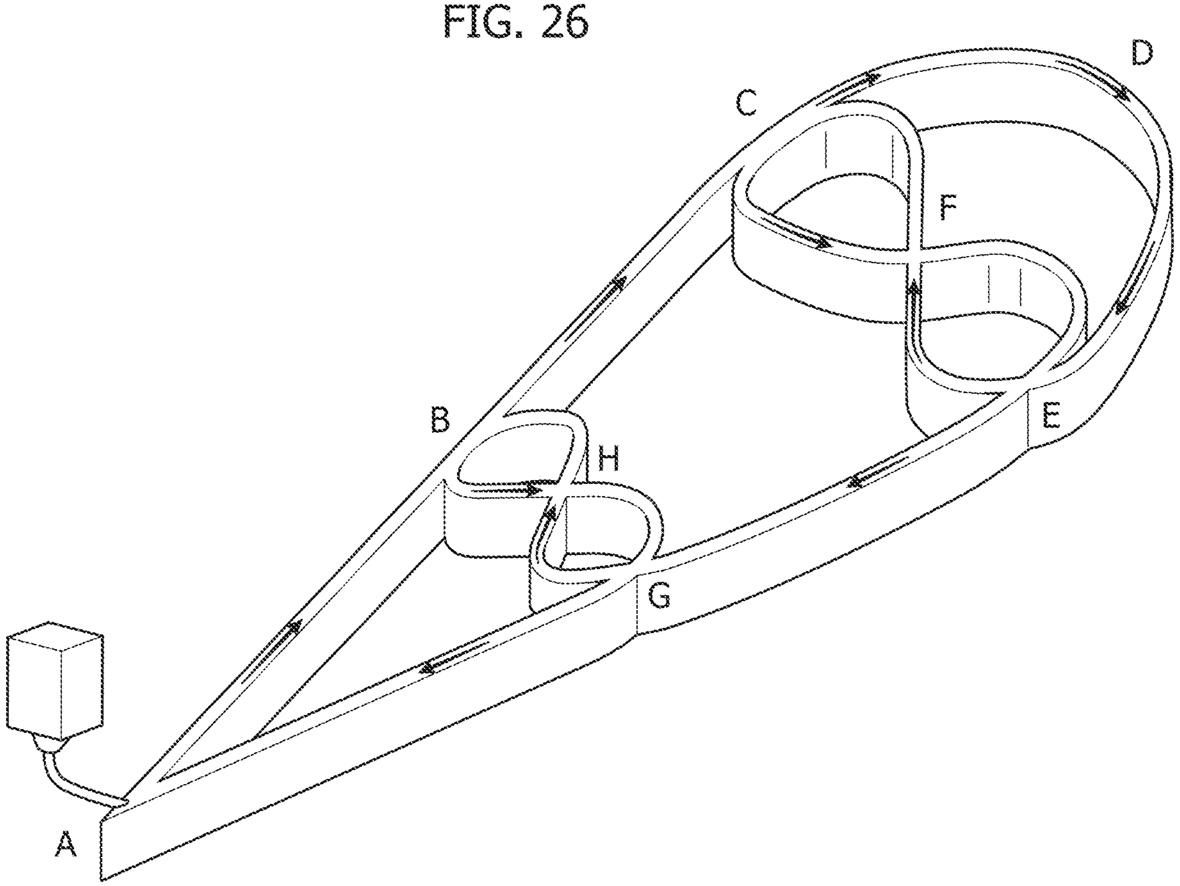

FIGS. 25 and 26 show examples of embodiment of the method according to the invention to provide wing elements or tails of aircraft or also turbine blades (for example, wind rotor blades). FIG. 25 shows an example of application of the technique represented in FIG. 8 (path with the formation of loops and overlaying of the thread at the base of each loop): the dispensing head defines each layer following the path A-B-C-D-E-F-D-F-C-A. FIG. 26 shows an alternative method in which the head follows the path A-B-C-D-E-F-E-G-H-G-A.

In either case, a structure of wing or tail or propeller blade made of a single piece is obtained including an outer shell and inner supporting and stiffening members or ribs The cavities 30 of the stiffening ribs 3 can be used for one or more different purposes.

Figure 27:
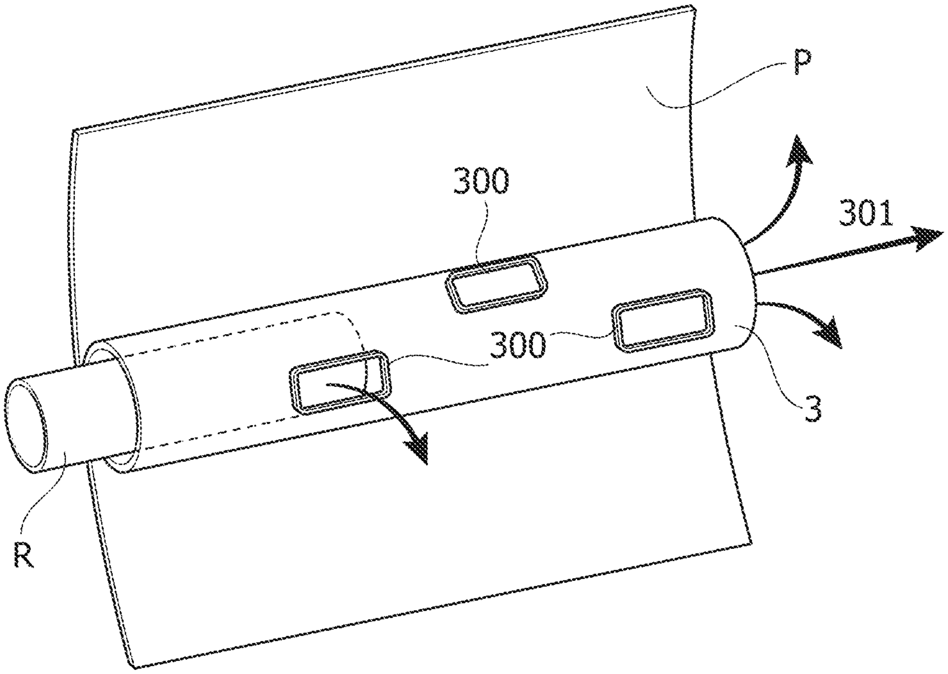
FIG. 27 is a perspective view of a detail of a stiffening rib of a panel, which shows an embodiment of the method where the cavity of the rib is filled with a resin.

With reference to FIG. 27, at least some of the hollow stiffening ribs 3 can be filled with resin R, for example epoxy resin that is injected into the cavities of the ribs possibly with the aid of a suction line 301 connected to a suction pressure source. For this purpose, the walls of the ribs 3 may present openings 300 that enable progressive exit of the resin, from the inside of the cavities of the ribs towards the outside, in such a way as to coat the outer surface of the ribs and the inner face of the panel P constituting the shell-like structure. This process can be obtained with the so-called vacuum-bagging technique.

Figure 28:
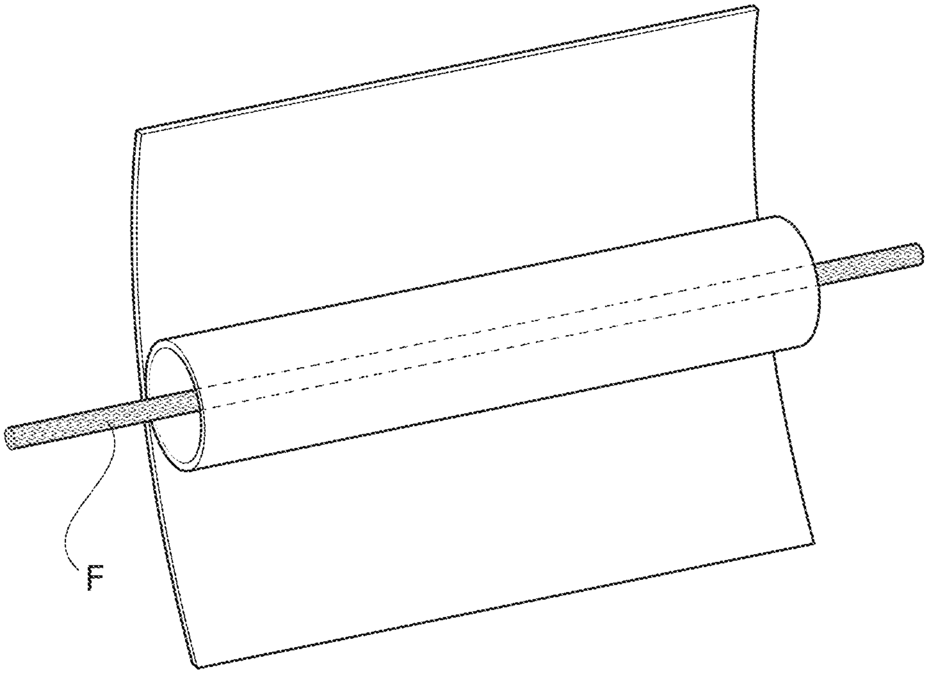
FIG. 28 is a perspective view of a detail of a stiffening rib of a panel, which shows insertion of a reinforcement fibre through the cavity of the rib.

The hollow ribs 3 can also be used (as an alternative or in addition to the arrangement referred to above) to introduce reinforcement fibres F (FIG. 28) after the panels P constituting the shell-like structure have been assembled together.

Figure 29:
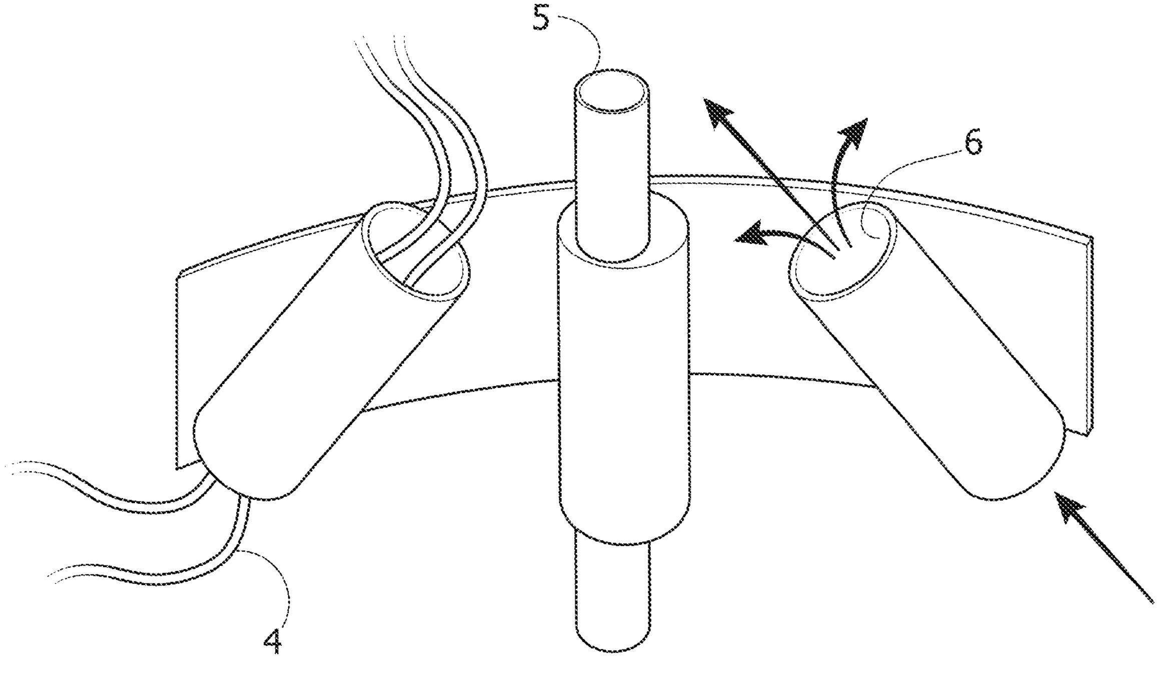
FIG. 29 is a further schematic perspective view that shows use of the cavities of the stiffening ribs for the passage of cables or service ducts or as ventilation ducts.

According to a further arrangement, the cavities of the stiffening ribs 3 can be used for the passage of electric cables 4 or hydraulic service ducts 5, or as ventilation ducts 6 (FIG. 29). This application is interesting from the practical standpoint in the case where the shell-like structures are used, for example, to produce hulls or other watercraft components, where the panels constituting the shell-like structure can be equipped with auxiliary elements, such as furnishing elements.

Finally, the hollow ribs 3 may also be used to facilitate alignment and assembly of different panels P that constitute the shell-like structure. For this purpose, it is possible to provide engagement elements, possibly also obtained simultaneously with formation of the panels, which are inserted into the cavities of the ribs to connect the panels P together.

Figure 30:
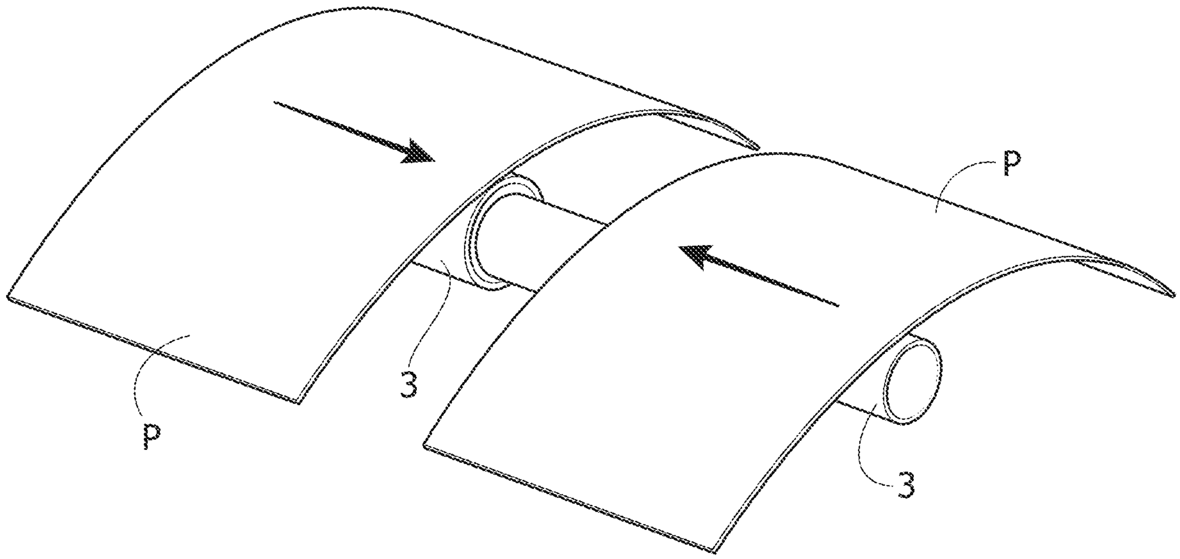
FIGS. 30-33 are further perspective views of details of the panels constituting a structure obtained using the method according to the invention, where the cavities of the stiffening ribs of the panels are used for insertion of elements of connection between the panels.
Figure 31:
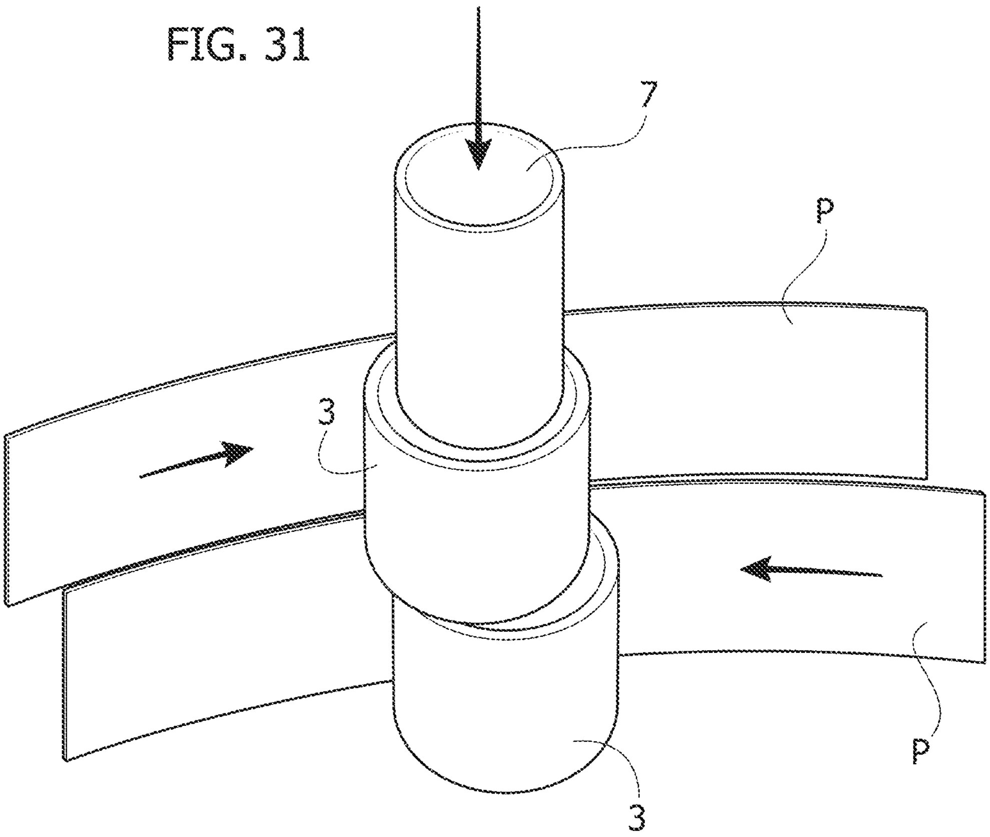

By way of example, FIG. 30 shows two panels P with stiffening ribs 3 of different diameter that are inserted into one another to provide connection between the panels. As may be seen, it is the rib itself of one of the panels that functions as engagement element to be inserted into the hollow rib of the other panel. FIG. 31 illustrates, instead, the case of two panels P that are coupled together by insertion of a cylindrical engagement element 7, into the hollow ribs 3 of both of the panels P.

Figure 32:
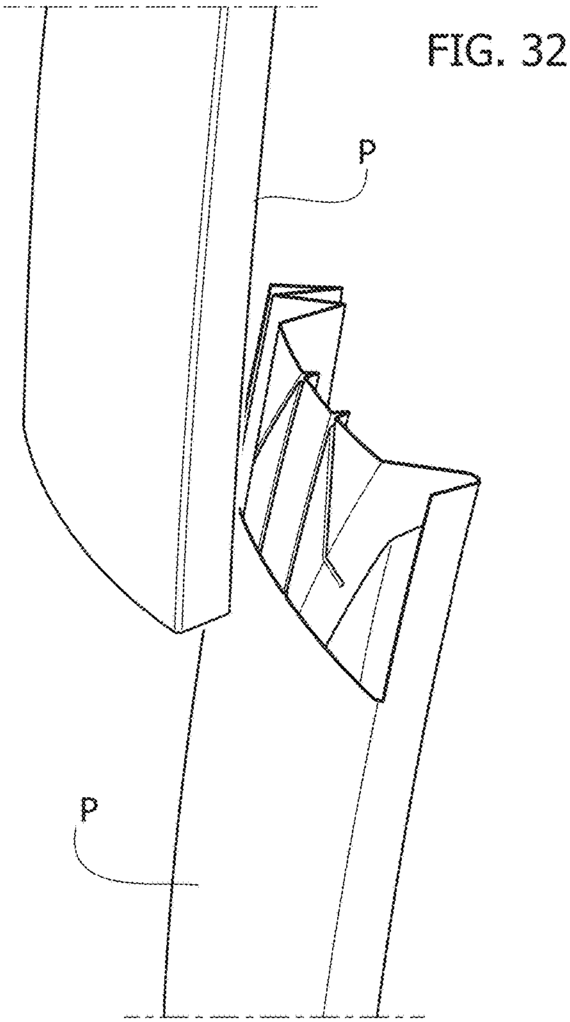
Figure 33:
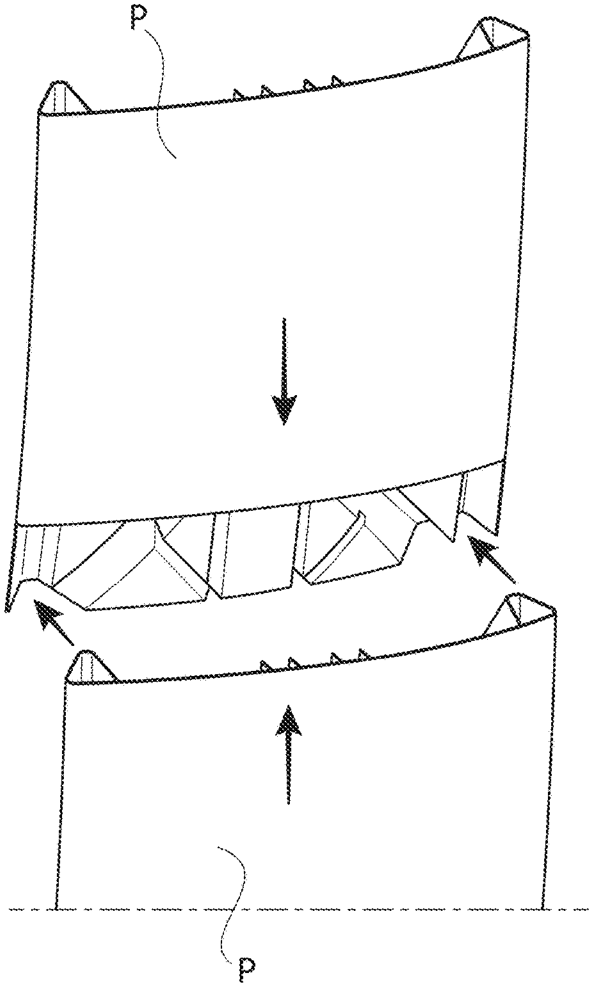

Assembly of the panels that constitute the shell-like structure can also be obtained by forming the panels with mutual-engagement portions, as illustrated in FIGS. 32 and 33. The panels can be rigidly connected together, for example by gluing or welding or riveting or by means of threaded joints. Thanks to the aforesaid techniques, large gluing surfaces are obtained, which guarantee a perfect assemblage of the different panels together.

Figure 34:
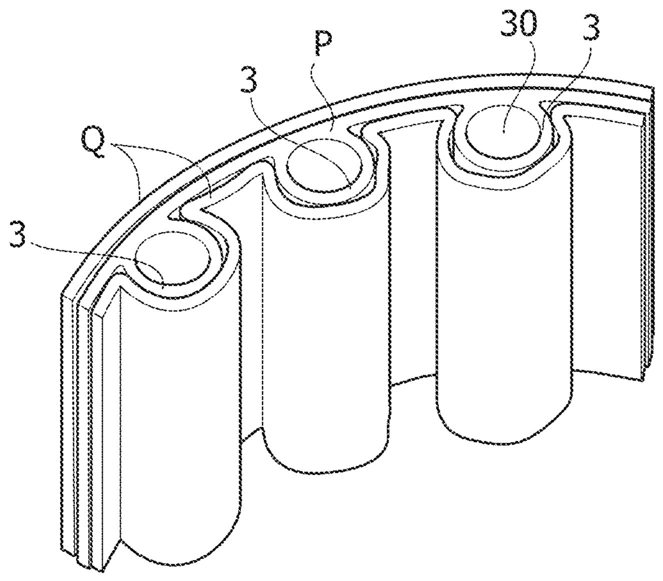
FIGS. 34 and 35 are schematic perspective views that illustrate further embodiments.

With reference to FIG. 34, one or more of the aforesaid panels P, either singly or in the assembled condition, are used as cores of multilayer structures obtained by coating at least one of the faces of the panels P with a covering layer Q, for example made of plastic material or composite material. The coating can be applied with manual or automated procedures such as: hand lay-up, prepreg, or vacuum processing and fibre placement. In the example represented in FIG. 34, the panel P is of the type having hollow stiffening ribs 3, with cavities 30, made of a single piece with the panel P during the additive-manufacturing operation. In this example, both of the faces of the panel P are coated with a covering layer Q.

Figure 35:
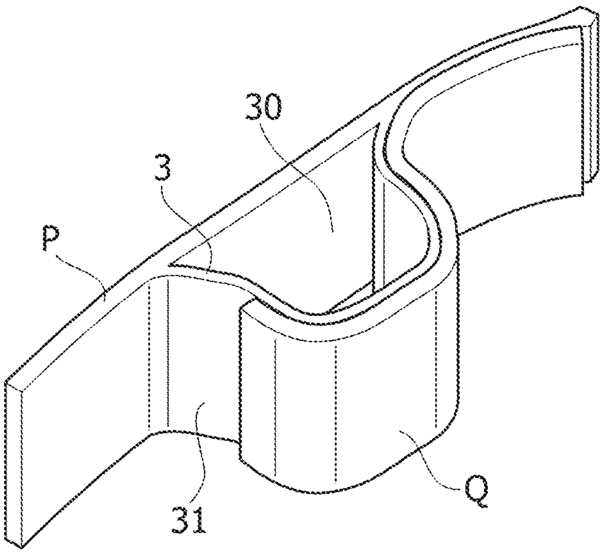

FIG. 35 shows an example in which, to favour adhesion of the covering layer Q (which in FIG. 35 has in part been removed for greater clarity of illustration) on the face of the panel P bearing the ribs 3 the ribs are designed in such a way as to present a curved surface 31 connecting the rib to the corresponding face of the panel.

As emerges clearly from the foregoing description, the method according to the invention enables shell-like supporting structures to be obtained formed by panels with relatively thin walls, which are very light and notwithstanding this present the necessary characteristics of strength, thanks to the provision of the stiffening ribs on the inner face of the panels. As described above, in the preferred embodiments, the stiffening ribs are made hollow, simultaneously with forming of the panels, preferably using any one of the deposition techniques described above (in the case where FDM technology is adopted). In this way, it is possible to achieve the aforesaid characteristics of lightness and strength, at the same time guaranteeing that the outer surfaces of the shell-like structures thus obtained are characterized by smooth and fair curvatures. The method according to the invention enables structures of large dimensions to be obtained, if necessary by fitting the panels together via mutual engagement at engagement portions, obtained, for example, by the stiffening ribs themselves or by auxiliary elements, or again by accordingly shaped portions of the panels. As also already mentioned, the panels may be obtained using different materials, such as thermoplastic, composite, metal, or ceramic materials. The deposition techniques described herein (in the case of FDM technology) enable both optimization of the weights of the panels and increase of adhesion between the forming layers of the panels through a reduction of the thermal losses during deposition of the material. In further embodiments, one or more of the aforesaid panels, either singly or in the assembled condition, are used as cores of multilayer structures obtained by coating at least one of the faces of the panels with a covering layer, for example made of plastic material or composite material.

As already mentioned, constituting preferred examples of application of the method according to the invention are the shell-like structures for hulls of watercraft, or for aircraft structures, or also, for example, for propeller blades or wind rotor blades, or the like.

Of course, without prejudice to the principle of the invention, the details of construction and the embodiments may vary widely with respect to what has been described and illustrated herein purely by way of example, without thereby departing from the scope of the present invention.

The invention claimed is:

1. A method for use in producing a supporting structure in the form of a shell or plate, comprising the steps of:

providing one or more panels that are to constitute the supporting structure, forming each panel of the one or more panels using an additive-manufacturing technology, with a lattice of stiffening ribs on at least one face of each panel, forming each panel and the stiffening ribs of each panel in a single piece, simultaneously with forming of each panel, by using FDM (Fused Deposition Modelling) technology, forming each panel layer by layer in a longitudinal direction of the panel, each layer being formed by moving a dispensing head so as to lay a continuous thread of material, such that each layer has a thickness of the thread in the longitudinal direction;

moving the dispensing head continuously to obtain each layer of each panel in the longitudinal direction by laying the continuous thread:

according to a closed-loop path, which includes a forward stretch wherein the head defines an outer face of the panel by laying the thread and a return stretch wherein the head lays the thread adjacent to the forward stretch including undulations to define a corresponding layer of the hollow tubular ribs on an inner face of the panel, wherein the laying the thread adjacent to the forward stretch to define the corresponding layer comprises forming a first tubular rib of the stiffening ribs having an inner closed cavity which opens at opposite longitudinal ends of the first rib; and the outer face and the corresponding layer having a thickness of the thread in the longitudinal direction along a longitudinal dimension of the panel and the ribs.

2. The method according to claim 1, wherein the lattice of stiffening ribs comprises different dimensional orders of ribs, so as to define a lattice of ribs of a first order and one or more lower orders of ribs, which have progressively decreasing dimensions.

3. The method according to claim 1, wherein at least some of the ribs of the first order are made hollow.

4. The method according to claim 1, wherein the inner closed cavity is filled with additional reinforcement material and is used for a passage of cables or service ducts or as a ventilation duct and is used to engage within the inner closed cavity elements of connection between the panels.

5. The method according to claim 1, wherein the panels are made of materials chosen from among polymeric material, composite material, metal material, cementitious material, and ceramic material.

6. The method according to claim 1, wherein one or more of said panels, either singly or in the assembled condition, are used as cores of multilayer structures obtained by coating at least one of the faces of the panels with a covering layer, for example made of plastic material or composite material.

7. The method according to claim 1, wherein the inner closed cavity is configured for a passage of cables therethrough.

8. The method according to claim 1, wherein the inner closed cavity comprises a service duct.

9. The method according to claim 1, wherein the inner closed cavity comprises a ventilation duct.

10. The method according to claim 1, wherein the inner closed cavity receives elements of connection to engage within the inner closed cavity the elements of connection between the panels.

11. The method according to claim 1, wherein the hollow ribs extend in a longitudinal direction along the longitudinal dimension of the panel.

12. The method according to claim 4, wherein the elements of connection consist of:

stiffening ribs of one or more panels configured and sized for being inserted into the cavities of further hollow stiffening ribs of further panels; or else auxiliary engagement elements, which are engaged within respective hollow ribs of the panels that are to be connected together.

13. The method according to claim 9, wherein, in order to favour adhesion of a covering layer on the face of the panel provided with the ribs, the ribs are designed in such a way as to present a curved surface connecting each rib to the corresponding face of the panel.

14. The method of claim 4 wherein the additional reinforcement material comprises resin with reinforcement fibres.

15. A method for use in producing a supporting structure in the form of a shell or plate, comprising the steps of:

providing one or more panels that are to constitute the supporting structure, forming each panel of the one or more panels using an additive-manufacturing technology, with a lattice of stiffening ribs on at least one face of each panel, forming each panel and the stiffening ribs of each panel in a single piece, simultaneously with forming of each panel, by using FDM (Fused Deposition Modelling) technology, forming each panel each panel layer by layer in a longitudinal direction of the panel, each layer being formed by moving a dispensing head so as to lay a continuous thread of material, such that each layer has a thickness of the thread in a longitudinal direction;

moving the dispensing head continuously to obtain each layer of each panel in the longitudinal direction by laying the continuous thread according to a path between two opposite ends, which is followed back and forth in two directions between the opposite ends to create different layers of the panel by laying the continuous thread by the head, each layer of the different layers having a thickness of the continuous thread in the longitudinal direction, said path including loop-shaped stretches, which are defined with or without overlaying of the portions of thread corresponding to the start and end of each loop and give rise to said hollow tubular ribs following upon superposition of the layers thus formed; and wherein each of said hollow tubular ribs has an inner closed cavity which opens at opposite longitudinal ends thereof.

16. The method according to claim 15, wherein the hollow ribs extend in a longitudinal direction along the longitudinal dimension of the panel.

* * * * *